US010878126B1

(12) United States Patent
Koduru et al.

(10) Patent No.: US 10,878,126 B1
(45) Date of Patent: Dec. 29, 2020

(54) BATCH TOKENIZATION SERVICE

(71) Applicant: Capital One Services, LLC, McLean, VA (US)

(72) Inventors: Naveen Teja Koduru, Frisco, TX (US); Kishore Doppalapudi, Frisco, TX (US); Ramesh Parvataneni, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/793,484

(22) Filed: Feb. 18, 2020

(51) Int. Cl.
*G06F 21/62* (2013.01)
*G06F 16/903* (2019.01)
*G06F 21/60* (2013.01)
*G06F 16/21* (2019.01)

(52) U.S. Cl.
CPC ........ *G06F 21/6245* (2013.01); *G06F 16/211* (2019.01); *G06F 16/903* (2019.01); *G06F 21/602* (2013.01)

(58) Field of Classification Search
CPC ........ H04L 67/22; H04L 9/0861; H04L 9/14; H04L 2209/42; H04L 63/00; H04L 63/108; H04L 9/088; H04L 9/0891; G06F 21/62; G06F 21/6254; G06Q 20/385
See application file for complete search history.

(56) References Cited

U.S. PATENT DOCUMENTS 9,292,707 B1 * 3/2016 Fontecchio ............... H04L 9/30
2019/0332807 A1 * 10/2019 LaFever ............ G06F 21/6254
2019/0342088 A1 * 11/2019 Eidson ............... G06F 11/3476

OTHER PUBLICATIONS

U.S. Appl. No. 16/793,502, De-Tokenization Patterns and Solutions, filed Feb. 18, 2020.

* cited by examiner

*Primary Examiner* — Olugbenga O Idowu
(74) *Attorney, Agent, or Firm* — Banner & Witcoff, Ltd.

(57) ABSTRACT

Methods and systems of data tokenization are described herein to provide protection for sensitive data. A tokenization service controller may extract sensitive data by determining a schema, the schema identifying which fields contain sensitive data. A token may be generated corresponding to each instance of the extracted sensitive data. The tokenization service controller may then generate a tokenized data set comprising a plurality of tokenized records arranged according to the same format as the original records, wherein the tokenized records use the generated tokens in place of the corresponding sensitive data.

20 Claims, 17 Drawing Sheets

BATCH TOKENIZATION SERVICE

CROSS REFERENCE TO RELATED APPLICATION

This application is related to the following U.S. Patent Application, filed on the same day: Ser. No. 16/793,502, titled "De-Tokenization Patterns and Solutions." The related application is incorporated by reference herein in its entirety for all purposes.

FIELD OF USE

Aspects of the disclosure relate generally to computer hardware and software that can be used to protect data. More specifically, aspects of the disclosure may provide for data protection by way of tokenization and de-tokenization.

BACKGROUND

Data is collected, transmitted, stored, and distributed every day. Data breach causes significant financial losses to enterprises and consumers, results in identity theft, and imposes security threats to a nation's economy. It is of paramount importance that data is protected as securely as possible. There is always a need for novel methods, systems, and services for protecting data.

Aspects described herein may address these and other problems, and generally improve the quality of data protection systems by offering tokenization and de-tokenization methods and services. Batch processing of data tokenization and de-tokenization may generally improve the efficiency and speed of data protection systems.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for data tokenization. This may have the effect of generally improving the quality of data protection systems. According to some aspects, these and other benefits may be achieved by generating a token to replace each corresponding instance of sensitive data. In implementation, this may be effected by a tokenization service controller engaging a token generator in generating tokens for the instances of sensitive data. The tokenized data set may be stored in a tokenized data storage. Tokenization may reduce the risk of exposing sensitive data in the event of a data breach, because the sensitive data has been replaced by tokens with random strings.

More particularly, some aspects described herein may provide a computer-implemented method for data tokenization. The method may include receiving a data set that has a number of records arranged according to a format. Each of the records may also include one or more fields. A schema of the received data set may be determined. As explained in greater details below, the schema may identify which of the one or more fields contains sensitive data, according to various embodiments. Instances of sensitive data in the received data set may be identified for each record in the plurality of records and based on the determined schema. The identified sensitive data may then be extracted from the one or more records in the received data set. Tokens corresponding to each instance of extracted sensitive data may be generated. Additionally, a tokenized data set may be generated. The tokenized data set includes a plurality of tokenized records arranged according to the same format as the un-tokenized data files. Also, the tokenized records use generated tokens in place the of the sensitive data and conforms to the determined schema.

Some aspects described herein may provide another computer-implemented method for data tokenization. An un-tokenized data set including a number of records may be received to be tokenized by a tokenization service controller. Each of the number of records may be arranged according to a format, and each of the records may contain one or more fields. Which fields contain sensitive data may be identified based on a schema. Therefore, it is important to determine the schema. Greater details on determining the schema are shown below. Based on the determined schema, instances of sensitive data for each record of the number of records in the received data set may be identified. Once the instances of sensitive data are identified, such sensitive data may be extracted. These instances of sensitive data may then be sent to a remote token generator, which includes an encryption system that may be used to encrypt individual values as tokens. The generated tokens may then be received by the tokenization service controller and used to replace the instances of sensitive data. The replacement may ensure that the same schema and format remain, so that the end result is a tokenized data set with a number of tokenized records, but the tokenized records are arranged according to the same format with the original un-tokenized data records.

Some aspects described herein may provide yet another computer-implemented method for data tokenization. The method may include receiving an un-tokenized data set including a number of records arranged according to a format, and each of the records containing one or more fields. To identify which of the one or more fields contains sensitive data, it is necessary to determine a schema of the received data set. Based on the determined schema, instances of sensitive data in the received data set may be identified for each record in the plurality of records. Then, the identified sensitive data from the one or more records in the received data set may be extracted. Afterwards, these instances of sensitive data may be transmitted to a remote token generator, which includes an encryption system that may be used to encrypt individual values as tokens. After receiving tokens corresponding to the instances of sensitive data from the remote token generator, a tokenized data set may be generated by a tokenization service controller. The key is to arrange the plurality of tokenized records according to the same format as the original un-tokenized records, while the one or more generated tokens may take place of the sensitive data. Eventually, the tokenized data set may be stored in a remote data store, hence increasing the security associated with the data set because the sensitive data has been replaced by tokens with random strings.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for data tokenization, de-tokenization, validation, and re-tokenization. As discussed further herein, this combination of features may allow for data protection.

Before discussing these concepts in greater detail, however, several examples of a computing device that may be used in implementing and/or otherwise providing various aspects of the disclosure will first be discussed with respect to FIG. 1.

Figure 1:
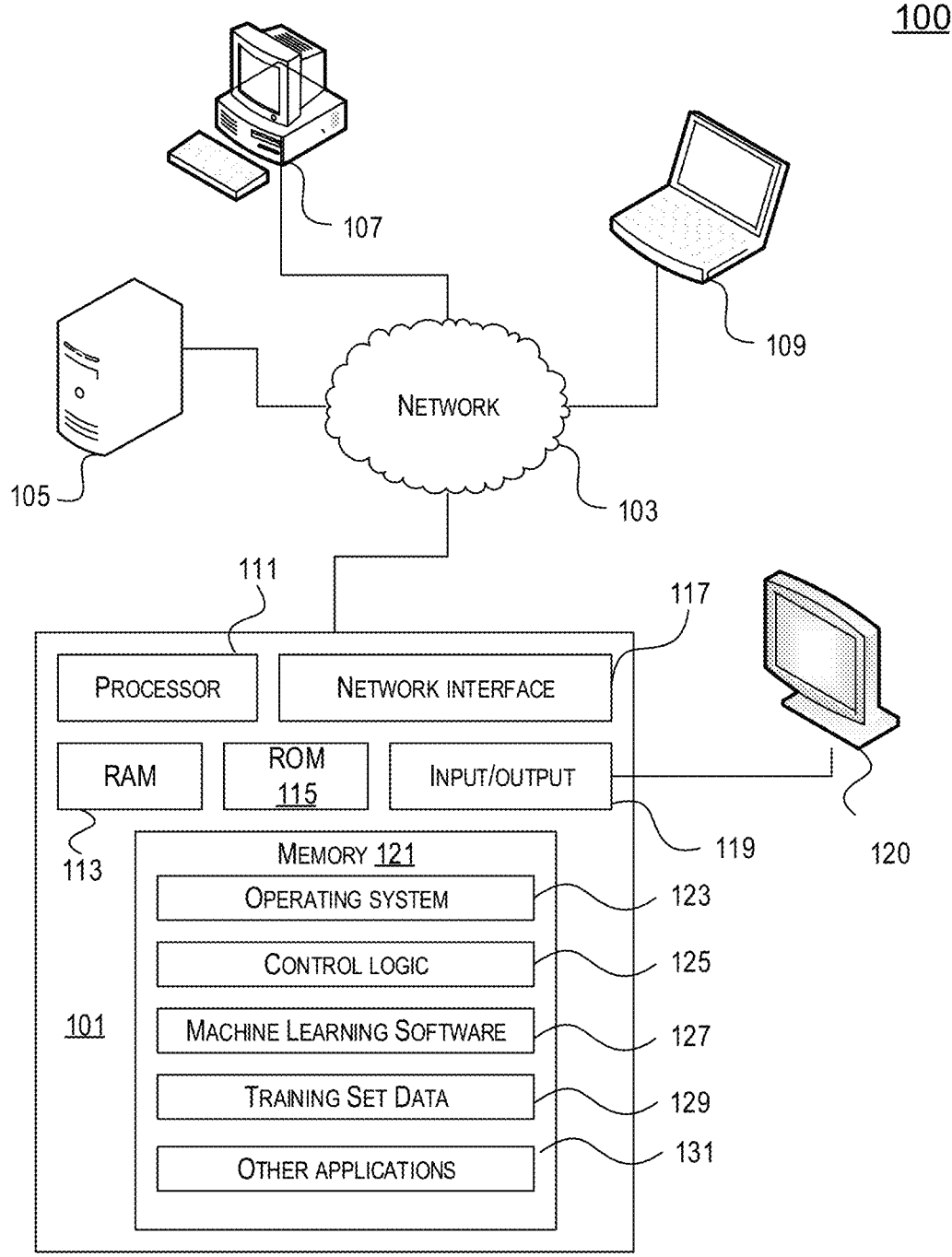
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 129. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to a method for providing a data tokenization, de-tokenization, validation, and/or re-tokenization service.

Figure 2A:
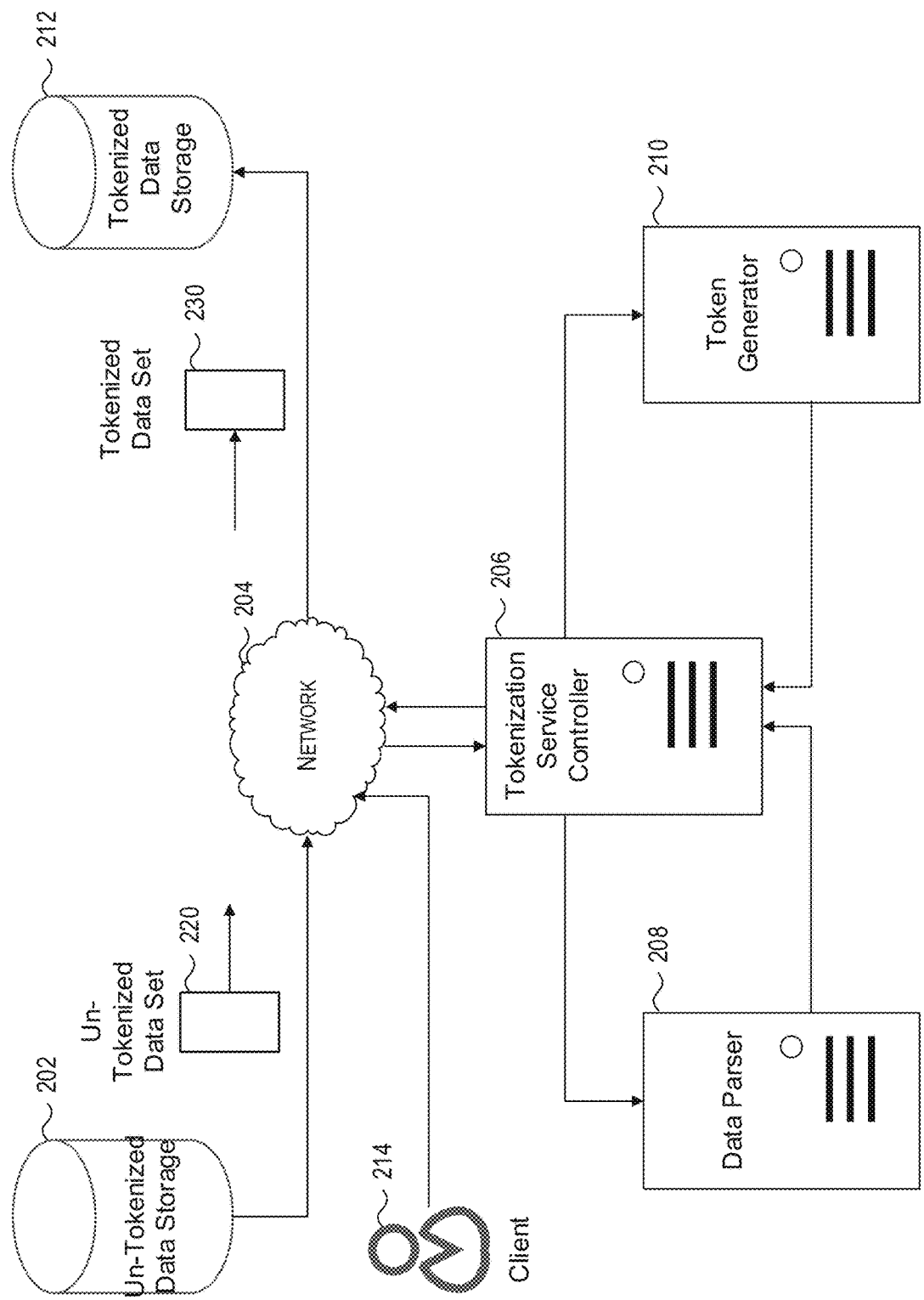
FIG. 2A depicts an example architecture of a system that may be used in implementing data tokenization in accordance with one or more illustrative aspects discussed herein.

FIG. 2A depicts an example architecture of a system 200 that may be used in implementing data tokenization in accordance with one or more illustrative aspects discussed herein. System 200 may generally include an un-tokenized data storage 202, a network 204, a tokenization service controller 206, a data parser 208, a token generator 210, and a tokenized data storage 212. The un-tokenized data storage 202 and the tokenized data storage 212 differ in that data stored in the un-tokenized data storage 202 is not tokenized, while data stored in the tokenized data storage 212 is tokenized. Tokenization may provide added protection in the event of a data breach because the sensitive data has been replaced by tokens with random strings. Both un-tokenized data storage 202 and tokenized data storage 212 may be a physical or virtualized data storage, or a public or private cloud data storage. Un-tokenized data may be received from the un-tokenized data storage 202 in batch. Tokenized data may be sent to the tokenized data storage 212 in batch.

According to various aspects of the disclosure, sensitive data may include any information that is personal to an individual or entity that needs to be protected. Some examples of sensitive information include identification information (e.g., social security number, driver's license number, state identification card number, passport number, etc.), benefit information (e.g., medical insurance, life and disability insurance, unemployment, welfare, etc.), background information (e.g., education, occupation, medical records, criminal history, driving records, etc.), personal information (e.g., name, date of birth, race and ethnicity, veteran status, gender identity, sexual orientation, social media records, digital footprint, travel history, etc.), banking information (bank account number, credit/debit card number, etc.), other financial information (investment portfolio, mortgage, insurance, etc.), contact information (e.g., mailing address, email address, phone number, etc.), etc.

Sensitive data may be stored in an un-tokenized data storage 202. According to various embodiments, the un-tokenized data storage may be any suitable data storage such as a physical database server, a public cloud storage, a virtualized database server, a private cloud storage, to name a few non-limiting examples. The un-tokenized data storage 202 may be equipped with standard data storage security features (e.g., physical restriction of access, authorization, authentication, key management system, etc.). However, the data stored is un-tokenized. Once the security features are compromised and there is a data breach, there is a risk of exposing the stored data. That's why according to various aspects of the disclosure, the data tokenization process may tokenize the data and reduce the risk of exposing the data in the event of a data breach, because the sensitive data has been replaced by tokens with random strings.

The data tokenization system 200 may process data to tokenize the data in batch. According to some embodiments, batch processing of sensitive data may occur at predetermined time intervals (e.g., daily, every 6 hours, every hour, every 15 minutes, etc.) depending on the specific needs of the application. For batch tokenization, the tokenization service may be triggered by predetermined time intervals and may perform automatically. Alternatively, or additionally, the batch processing service may occur when triggered by a triggering event such as a request from another process or receipt of a predetermined number of data records that have yet to be processed. In some embodiments, data tokenization may be based on a client request. In such embodiments, a client 214 may submit a job request through the network 204 to the tokenization service controller 206. Once the tokenization service controller 206 receives the request, it may provide the tokenization service to process the job submitted by the client 214.

Figure 2B:
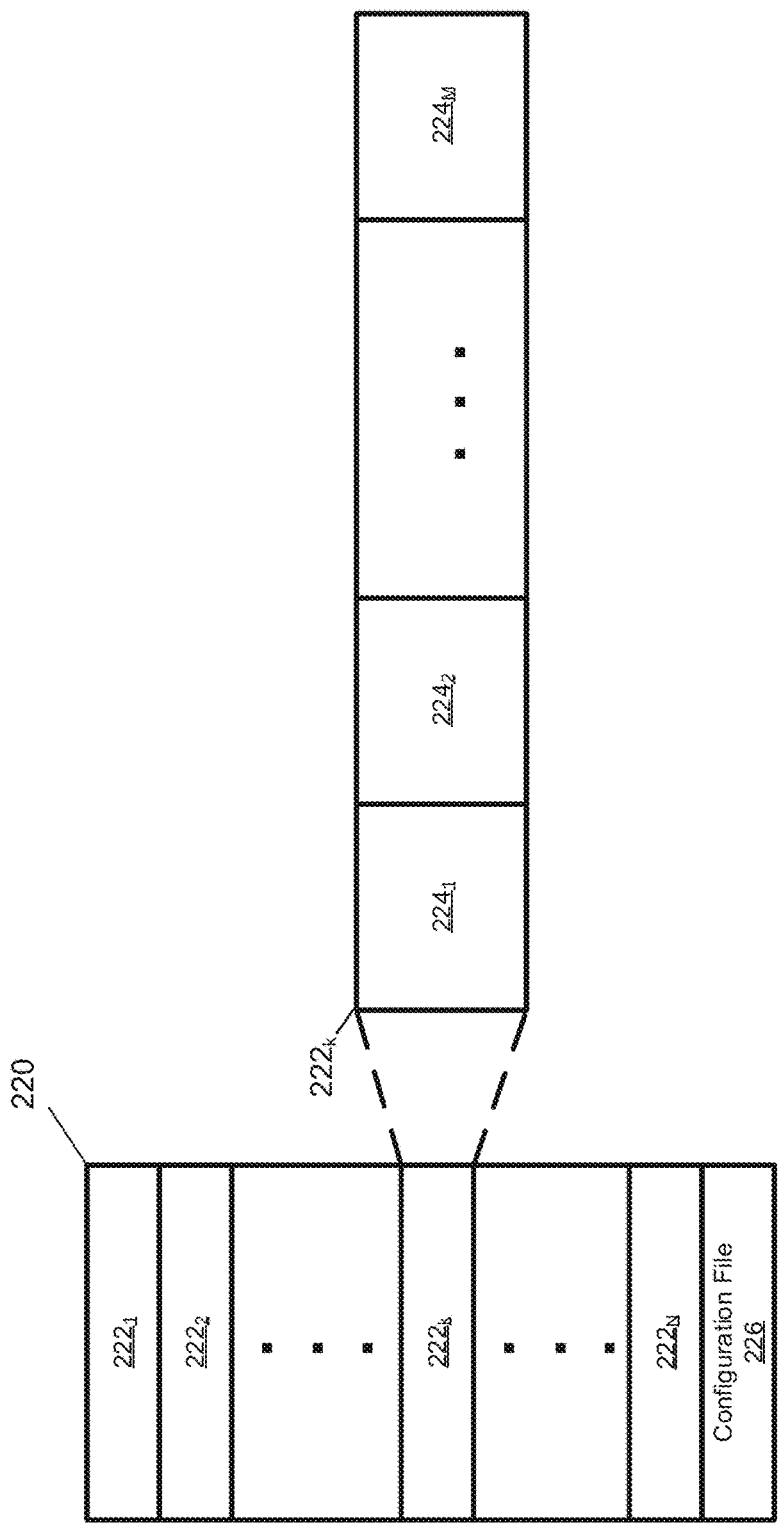
FIG. 2B illustrates a set of un-tokenized records according to one or more illustrative aspects discussed herein.

The tokenization service controller 206 controls the process of batch tokenizing data sets 220 for the system 200. The data set 220 may comprise a plurality of records 222 arranged according to a format. For example, as shown in FIG. 2B, the data set 220 can contain a number of different records ($222_1$, $222_2$, ... $222_N$, collectively referred to herein as "records 222"). The data set 220 may also contain a configuration file 226 that defines, for example, a schema associated with the data set 220 or other relevant data about the data set 220. Furthermore, each record 222 may contain a number of fields 224. For example, as shown in FIG. 2B, arbitrary record $222_k$ includes a number of fields $224_1$, $224_2$, ..., $224_M$ (collectively referred to herein as "fields 224"). For ease of explanation, the records 222 have been depicted as one dimensional arrays. However, the present disclosure should not be understood to be so limited—indeed any suitable format could be used for the records according to the various embodiments described herein. For example, the records 222 could be in EXCEL, WORD, TXT, ZIP, BZ2, JSON, DYNAMIC JSON, XML, HTML, PARQUET, AVRO, ORC, etc., to name a few non-limiting examples.

As discussed, each of the records 222 may contain one or more fields 224. Some of these fields 224 may contain sensitive data, some may not. The tokenization service controller 206 may then determine the schema of the received data set 220. Determining the schema may be by reading the configuration file 226 associated with the records 222. The schema may provide structural information as for which of the one or more fields contains sensitive data. The schema may contain information such as the total number of fields 224, the name of each field 224 such as type of data (e.g., date, social security number, account number, etc.), the order of the different types of data in each record 222, the address of each field 224 and record 222 in the storage 202, etc.

Referring now to FIGS. 2A and 2B, the tokenization service controller 206 may determine the schema itself associated with data set 220 by reading the configuration file 226. In some embodiments, the tokenization service controller 206 may instruct a data parser 208 to parse the configuration file 226. The tokenization service controller 206 may be connected with the data parser 208 via the network 204. The data parser 208 may be more specialized in parsing the configuration file 226 associated with the received data set 220 than the tokenization service controller 206. The data parser 208 may be equipped with specialized software and/or applications to parse configuration files 226, decompress overly compressed configuration files 226, convert unreadable configuration files 226 into readable formats for the tokenization service controller 206, etc. The data parser 208 may complete reading the configuration file 226 and send the schema information to the tokenization service controller 206, or the data parser 208 may present the configuration file 226 in a more readable manner and send the files 226 back to the tokenization service controller 206, thus facilitating the tokenization service controller 206 in finding a pattern and determining the schema. Otherwise, some configuration files 226 may be too compressed or difficult to be determined by the tokenization service controller 206 without specialized software and/or applications. In some embodiments, the tokenization service controller 206 may query a database (housed, in some instances, on the data parser 208) to determine the schema. The database may contain historic records that may have matching patterns or structures with the querying record 222. The tokenization service controller 206 may determine the schema based on the match between the querying record 222 and a historic record.

After determining the schema, the tokenization service controller 206 may identify instances of sensitive data for each record in the plurality of records 222 in the received data set 220. For example, the tokenization service controller 206 might identify that record 222$_k$ contains sensitive data (e.g., a social security number or the like) in field 224$_2$. The tokenization service controller 206 may then extract the identified sensitive data in field 224$_2$. Extracting sensitive data may include validating sensitive data format by comparing the format of the extracted sensitive data to one or more known sensitive data format. For instance, using the social security number example, validating the sensitive data format may involve confirming that the data has the correct number of characters (i.e., nine) and that it is only numerical. Similar validations may be made for credit card numbers (having 16 digits), or other kinds of sensitive data. If the format matches (i.e., correct number of characters, correct kinds of characters, etc.), the tokenization service controller 206 may queue the extracted sensitive data in an order for tokenization with the token generator 210. If the format does not match, the tokenization service controller 206 may determine that the extraction may be incorrect, and to avoid tokenizing the data incorrectly, the tokenization service controller 206 may treat it as non-sensitive data and not tokenize it, or alternatively (or in addition to) the tokenization service controller 206 may return an error message.

After extracting the identified sensitive data, the tokenization service controller 206 may generate one or more tokens corresponding to each instance of the extracted sensitive data. The tokenization may take place according to the order of the queue of the extracted sensitive data. In some embodiments, the tokenization service controller 206 may instruct the token generator 210 to complete the tokenization task, because the token generator 210 may be equipped with more specialized software and/or applications for generating tokens. In some embodiments, the token generator 210 may be remote from the tokenization service controller 206, but the token generator 210 may also be local to the tokenization service controller 206 in some embodiments. The token generator 210 may generate one or more tokens corresponding to each instance of the extracted sensitive data, and provide those tokens to the tokenization service controller 206.

The tokenization service controller 206 may then generate a tokenized data set 230 comprising a plurality of tokenized records arranged according to the same format as the original non-tokenized data set 220. When generating the tokenized data set 230, the tokenization service controller 206 may move or copy the un-tokenized data records 222, replace the sensitive data fields 224 with tokens generated by the token generator 210, and write into the tokenized data set 230. The tokenization service controller 206 may record the address of each sensitive data field when identifying and extracting the sensitive data fields 224, so that the replacement is exact. Each tokenized record conforms to the determined schema, so that the one or more generated tokens takes place of each instance of extracted sensitive data, while no change takes place for the non-sensitive data.

In some embodiments, the tokenization service controller 206 may further check non-sensitive fields based on the determined schema, for additional sensitive data. For example, the tokenization service controller 206 may analyze a non-sensitive field (e.g., a "notes" field) to determine whether it contains any sensitive information. In some embodiments, this may occur by analyzing strings in the non-sensitive field to determine whether any of them are in known sensitive data formats. For example, the tokenization service controller 206 might scan a field to determine whether any of the strings conform to a telephone number format, which could be identified as sensitive. That is, the tokenization service controller 206 may compare values in the non-sensitive fields to pre-determined rules to check if a value in the non-sensitive fields comprises sensitive data. In another instance, the tokenization service controller 206 may determine if there is a social security number in the "notes" field. This may help eliminate errors and omissions that may have taken place during data collection. If there are additional sensitive data instances, the tokenization service controller 206 may generate additional tokens and replace the identified non-sensitive fields with additional tokens.

The tokenized data set 230 may be stored in the tokenized data storage 212. The data storage 212 is protected with a number of standard security features (e.g., physical restriction of access, authorization, authentication, key management system, etc.). The added advantage is that data is now tokenized. Even if other security features are compromised and there is a data breach, there is added protection against exposing the stored data because the sensitive data has been replaced by tokens with random strings.

Figure 3:
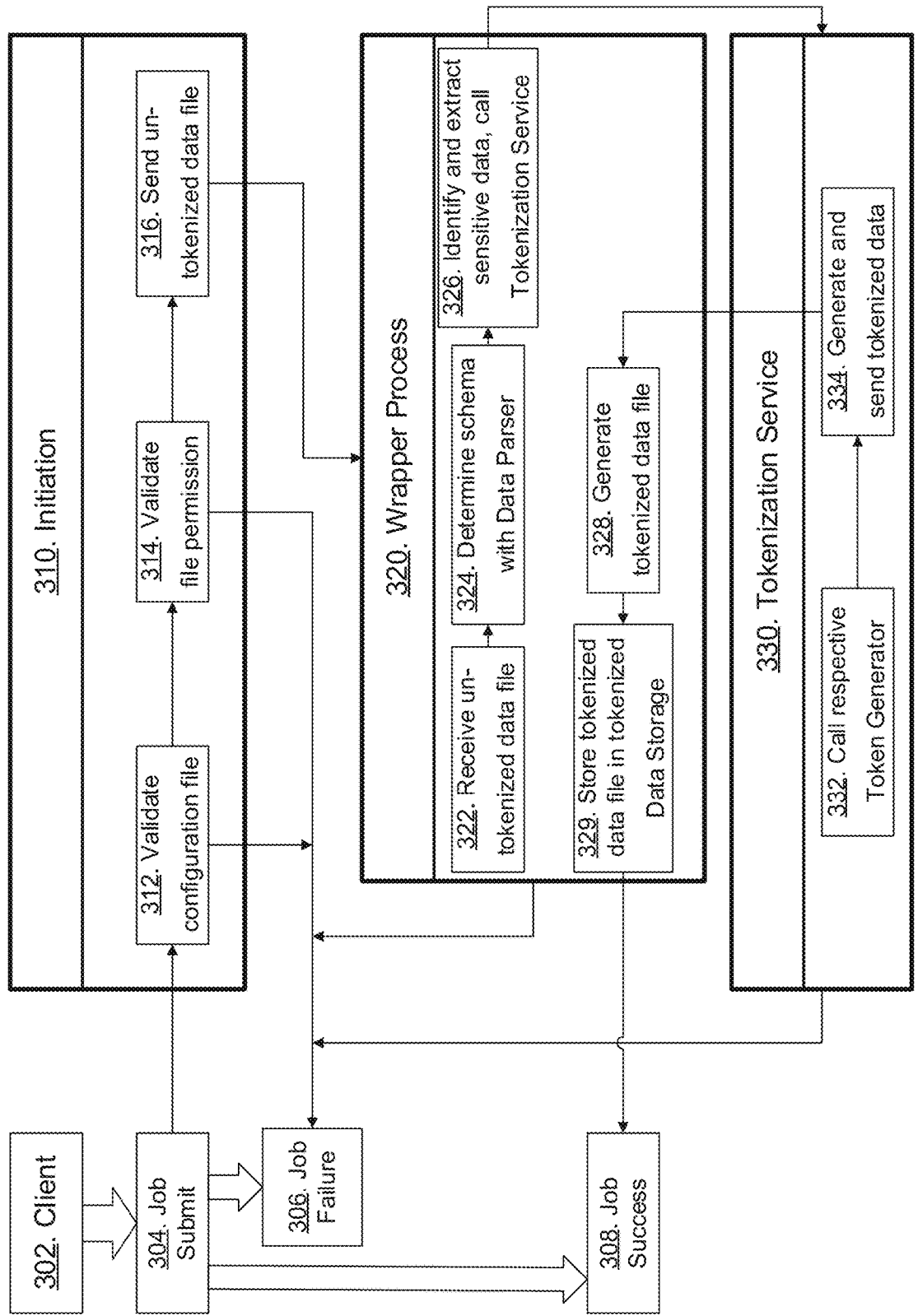
FIG. 3 is a task chart for each component of a system that may be used in implementing data tokenization in accordance with one or more illustrative aspects discussed herein.

FIG. 3 is a task chart for each component of a system 300 that may be used in implementing data tokenization in accordance with one or more illustrative aspects discussed herein. Data tokenization tasks may be categorized into three groups based on the components of the system 300 that carry out the tasks, initiation 310, wrapper process 320, and tokenization service 330. The initiation 310 component and the wrapper process 320 component may be implemented by the tokenization service controller 206. The initiation 310 component may alternatively or additionally be implemented by computing devices at data collection. The tokenization service 330 may be implemented by the tokenization service controller 206 or the token generator 210. The data tokenization process is in a "black box" in that if a client 302 submits a job request 304, the client 302 may get notified for a job failure 306 or a job success 308, but may not see the process of data tokenization happening. In the embodiment of a batch tokenization based on predetermined time intervals, there may be no client 302 or client job submit 304, but there may still be a notification setup to indicate a job failure 306 or a job success 308.

The initiation 310 component may be implemented by a client device or by a data source device (e.g., a device that collects data in the field and submits a daily data batch, etc.). Or the initiation 310 component may be implemented by the tokenization service controller 206. The initiation 310 component may check to make sure the submitted jobs are executable by the tokenization service. A first task in the initiation 310 component may occur at 312, where the initiation 310 component validates an input configuration file (e.g., 226) to make sure it is valid and executable for the tokenization service. The validation of the configuration file 226 is to check if the configuration file 226 is corrupted, or in the incorrect format. Certain formats may not be able to be read by the tokenization service controller 206 and need to be converted by the data parser 208. Next, at 314, the initiation 310 component may validate target file permission to ascertain that it is allowable to copy, move, read, write, etc. Checking file permission may be checking an access restriction associated with the un-tokenized files 220 in the configuration file 226. After making sure the input configuration file 226 is valid and executable, and it is permissible to copy, move, read, write, etc. the un-tokenized data files 220, the initiation 310 component, at 316, may then submit the job by sending the un-tokenized data file 220 to the wrapper process 320 component.

The wrapper process 320 component may be implemented by the tokenization service controller 206 according to various embodiments. The wrapper process 320 component processes files both before and after tokenization. Prior to tokenization, at 322, the un-tokenized data file 220 is received and, at 324, a schema is determined. According to some embodiments, determining the schema may be implemented by the tokenization service controller 206. In some embodiments, the schema may be determined by the tokenization service controller 206 engaging a data parser 208 in parsing, decompressing, or converting the configuration file 226. The data parser 208 may parse, decompress, or convert files 226 in formats such as EXCEL, WORD, TXT, ZIP, BZ2, JSON, DYNAMIC JSON, XML, HTML, PARQUET, AVRO, ORC, etc., and recognize the schema by observing a pattern in the configuration files 226. Additionally, in some embodiments, historic records in a database housed on the data parser 208 may be used to determine the schema. In such an arrangement, the tokenization service controller 206 or the data parser 208 may query the database to determine the schema based on a match of patterns between the querying record 222 with historic records. The purpose of determining the schema is to ascertain which fields 224 of each record 222 contain sensitive data. In both cases, after determining the schema and at 326, a third task may be the tokenization service controller 206 identifying and extracting sensitive data, and calling the tokenization service 330 component.

The tokenization service 330 component implements the tokenization process. In some embodiments, the tokenization service controller 206 may generate tokens itself. In the case where the tokenization service 330 is called, respective token generators 210 may be engaged at 332. The token generators 210 may be remote from the tokenization service controller 206. The token generators 210 may generate tokens at 334 corresponding to each instance of the extracted sensitive data and send tokens back to the wrapper process 320 component. Then the wrapper process 320 component takes control again after the tokenization.

After tokenization, the wrapper process 320 component may again be engaged. As shown in FIG. 3, at 328, the tokenization service controller 206 may generate a tokenized data file after receiving the tokens from the tokenization service 330 component. The generation of tokenized data file 230 at 328 may comprise arranging a plurality of tokenized records according to the same format with the original un-tokenized data file 220, with the tokens replacing the corresponding instances of the sensitive data. After the tokenized data file 230 is generated, the wrapper process 320 component, at 329, may store the tokenized data file 230 in the tokenized data storage (e.g., 212).

According to the various embodiments, the initiation process 310 component, the wrapper process 320 component, and the tokenization service 330 component, may be each able to generate a failure message at 306 if a task fails. For example, failure messages may be generated upon a failure to validate an input configuration file 226, validate file permissions, determine the schema, identify sensitive data, extract sensitive data, communicate between components, engage token generators 210, generate tokens, generate tokenized data files 230, store the tokenized data files 230, etc. After successful completion of storing the tokenized data file 230 in the tokenized data storage 212, at 329, a job success message can be generated at 308.

Figure 4:
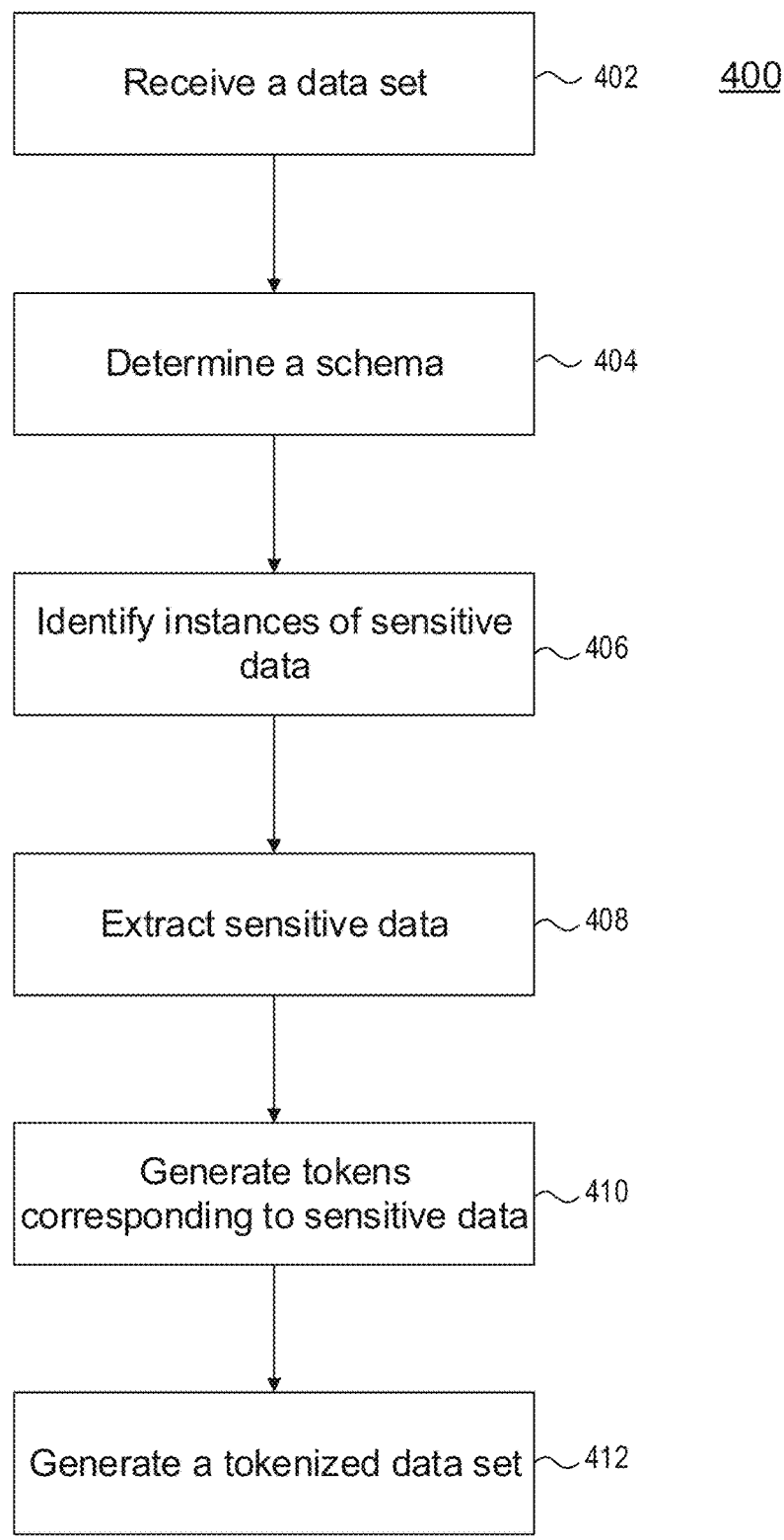
FIG. 4 is a flow chart for a method of data tokenization in accordance with one or more illustrative aspects discussed herein.

FIG. 4 is a flow chart for a method 400 of data tokenization in accordance with one or more illustrative aspects discussed herein. For the purposes of clarity, FIG. 4 is described with reference to FIGS. 2A, 2B, and 3, but it should be understood that method 400 is not limited to being performed by the systems illustrated therein. According to the method 400, at 402, an un-tokenized data set 220 may be received. Data set 220 may comprise a plurality of records 222 arranged according to a format, wherein each of the records 222 comprises one or more fields 224. The format may be EXCEL, WORD, TXT, ZIP, BZ2, JSON, DYNAMIC JSON, XML, HTML, PARQUET, AVRO, ORC, etc., to name a few non-limiting examples. To facilitate processing, records of the same format may be batched together. Different formats may be organized into different batches by the initiation 310 component prior to sending the data files 220 to the wrapper process 320 component. Or the batching may be implemented by the tokenization service controller 206. The one or more fields 224 of each record 222 may contain sensitive data, and non-sensitive data. A schema may provide structural information as for which fields may contain sensitive data. The schema may contain information such as the total number of fields 224, the name of each field such as type of data (e.g., date, social security number, account number, etc.), the order of the different types of data in each record 222, the address of each field 224 and record 222 in the storage 202, etc.

At 404, the schema of the received data set 220 is determined. The schema may identify which of the one or more fields contains sensitive data. According to some embodiments, 404 may be performed by the tokenization service controller 206. In some embodiments, the tokenization service controller 206 may engage a data parser 208 to parse configuration files 226 associated with the received data set 220. The data parser 208 may be equipped with specialized software and/or applications to parse configuration files 226, decompress overly compressed configuration files 226, convert unreadable configuration files 226 into readable formats for the tokenization service controller 206, etc. Some configurations files 226 may be impossible to discern a pattern and determine a schema without first being parsed, decompressed, or converted into a different format. In other embodiments, the data parser 208 may also house a database containing historic records with the same schema. The tokenization service controller 206 or the data parser 208 may simply query the database to determine the schema based on a match between the querying record 222 and a historic record. The schema may have structural information as for what fields contain sensitive data.

At 406, instances of sensitive data for each record 222 in the plurality of records in the received data set 220 may be identified based on the determined schema. According to some embodiments, 406 may be implemented by the tokenization service controller 206. The identification of instances of sensitive data is based on the schema with structural information as for what fields contain sensitive data.

At 408, identified sensitive data from one or more records 222 in the received data set 220 may be extracted. 408 may be implemented by the tokenization service controller 206. Extracted sensitive data may be compared to a known sensitive data format. For instance, a social security number may have 9 numerical digits, a credit card number may have 16 numerical digits, etc. If the extracted sensitive data conforms to the known sensitive data format, it is a reassurance that the extraction is correct and tokenization may be performed on these sensitive data instances. If the extracted sensitive data does not conform to the known sensitive data format, it may be an indication that the extraction is incorrect. The wrapper process 320 component may generate an error message, and no tokenization may take place for the incorrectly extracted sensitive data. Extracting sensitive data from the identified fields may also comprise compiling a queue of sensitive data values, and wherein generating the one or more tokens comprises the tokenization service controller 206 sending the sensitive data values compiled in the queue to a token generator 210 in the order they are queued.

At 410, one or more tokens corresponding to the sensitive data may be generated, based on the extracted sensitive data. According to some embodiments, 406 may be implemented by the tokenization service controller 206, or the tokenization service controller 206 may call the tokenization service 330 component to engage a token generator 210. The token generator 210 may be remote from the tokenization service controller 206. The token generator 210 may comprise an encryption system equipped with specialized software and/or applications that are configured to encrypt individual values as tokens. If the token generator 210 is engaged, the tokenization service controller may send one or more instances of extracted sensitive data to the token generator 210; the token generator 210 may generate one or more tokens corresponding to the sensitive data; and the tokenization service controller 206 may receive tokens corresponding to the one or more instances of sensitive data from the token generator 210.

At 412, a tokenized data set 230 may be generated. The tokenized data set 230 may comprise a plurality of tokenized records arranged according to the same format as the original un-tokenized data set 220, wherein the tokenized records use the one or more generated tokens in place of the sensitive data, and wherein the tokenized data set conforms to the determined schema. 412 may be implemented by the tokenization service controller 206.

The method 400 of data tokenization may further comprise storing the tokenized data set 230 in a tokenized data storage 212. The method 400 may further comprise automatically detecting additional sensitive data in a non-sensitive field (e.g., "notes" field) by comparing strings in the non-sensitive filed to pre-determined rules; generating an additional token corresponding to the additional sensitive data; and replacing the additional sensitive data with the additional token in the tokenized data set 230. These may be implemented by the tokenization service controller 206, the data parser 208, and the token generator 210. The method 400 may further comprise, wherein the received data set 220 is encrypted, decrypting the received data set 220; and encrypting, after its generation, the tokenized data set 230.

Figure 5:
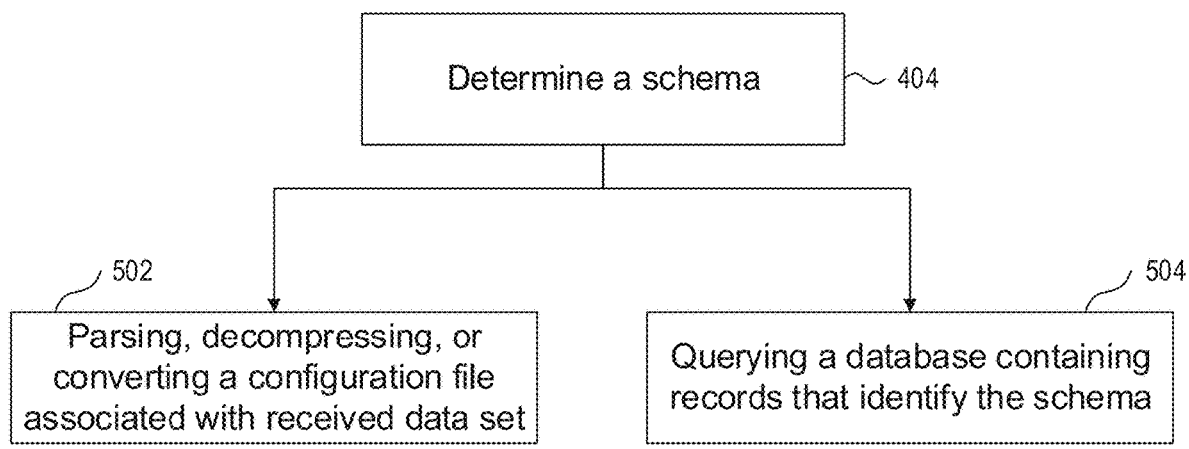
FIG. 5 is a flow chart for a method of determining a schema in accordance with one or more illustrative aspects discussed herein.

FIG. 5 is a flow chart for a method 404 of determining a schema in accordance with one or more illustrative aspects discussed herein. For the purposes of clarity, FIG. 5 is described with reference to FIGS. 2A, 2B, and 3, but it should be understood that method 404 is not limited to being performed by the systems illustrated therein. The schema may provide structural information as for what fields contain sensitive data, and what fields contain non-sensitive data. The schema may contain information such as the total number of fields 224, the name of each field 224 such as type of data (e.g., date, social security number, account number, etc.), the order of the different types of data in each record 222, the address of each field 224 and record 222 in the storage 202, etc. Determining the schema may comprise finding a pattern in the record 222 of the data set 220. The schema may be determined by the tokenization service controller 206 by reading the configuration file 226. However, some configuration files 226 may be impossible to find a pattern and determine the schema. For instance, the configuration file 226 may be too compressed or in the incorrect format. Therefore, determining the schema 404 may comprise, at 502, parsing, decompressing, or converting the configuration file 226 associated with the received data set 220. Parsing, decompressing, or converting the configuration file 226 into a more easily determinable format may facilitate finding the pattern and determining the schema to ascertain what fields contain sensitive data. In some embodiments, 502 may be implemented by the tokenization service controller 206. In some embodiments, 502 may be implemented by the data parser 208. The data parser 208 may be remote from the tokenization service controller 206. Determining the schema 404 may also comprise, at 504, querying a database containing historic records with the same schema. The database may be housed on the data parser 208. The same schema may exist in historic records of the same format. If a querying record 222 matches with a historic record in format, pattern, or schema, the same schema may be determined instead of parsing, decompressing, or converting the associated configuration file 226. The querying may be implemented by the tokenization service controller 206, or the data parser 208.

Figure 6:
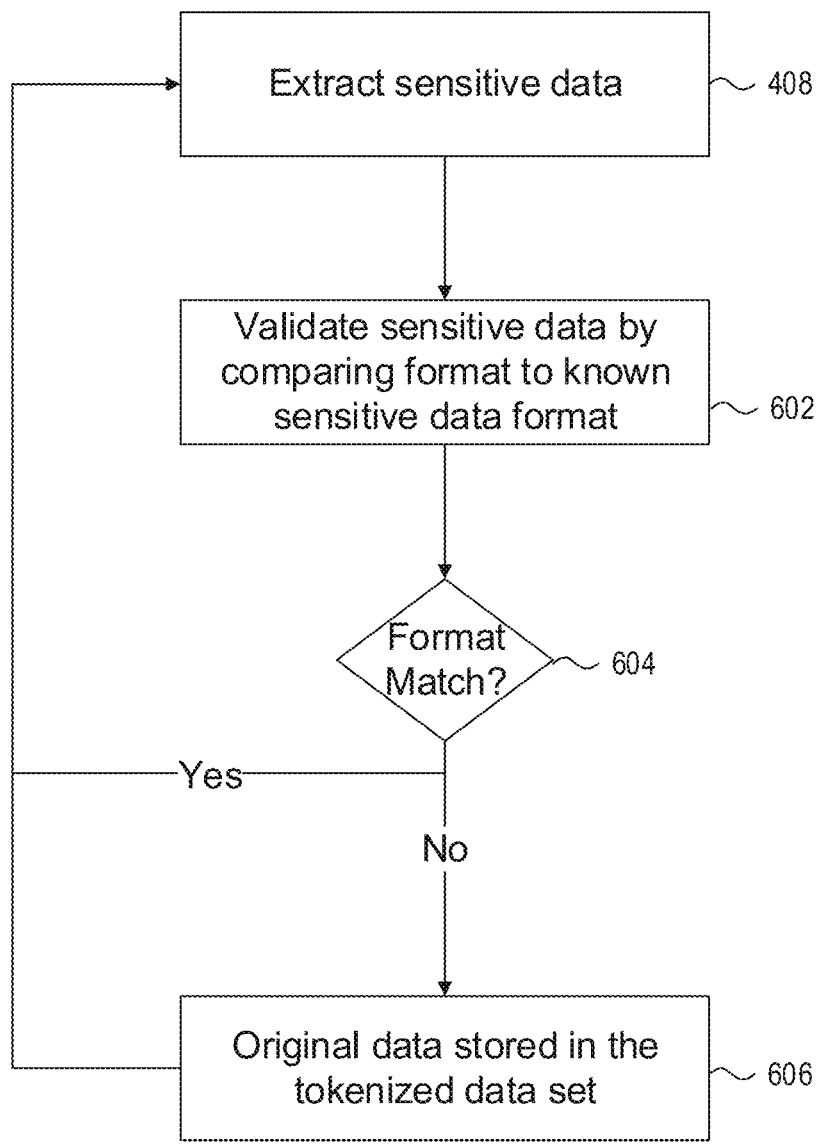
FIG. 6 is a flow chart for a method of validating extracted sensitive data formats in accordance with one or more illustrative aspects discussed herein.

FIG. 6 is a flow chart for a method 408 of validating extracted sensitive data formats in accordance with one or more illustrative aspects discussed herein. For the purposes of clarity, FIG. 6 is described with reference to FIGS. 2A, 2B, and 3, but it should be understood that method 408 is not limited to being performed by the systems illustrated therein. After sensitive data is extracted at 408, the method 408 may validate the extracted sensitive data by comparing its format to a known sensitive data format at 602. For instance, a social security number may have 9 numerical digits, a credit card number may have 16 numerical digits, etc. If the format matches at 604, the match may provide a reassurance that the extraction is correct, and the tokenization service controller 206 may send the extracted sensitive data to the tokenization service 330 component, or the tokenization service controller 206 may continue to extract additional sensitive data at 408. If the format does not match 604, it may be likely that the sensitive data was incorrectly identified at 406 or extracted at 408. In this case, the tokenization service controller 206 may generate an error message, or the tokenization service controller 206 may continue to call the tokenization service 330 component but no tokens may be generated for the incorrectly extracted sensitive data and the original data may be stored at 606 in the corresponding field to avoid incorrectly tokenizing data.

Figure 7:
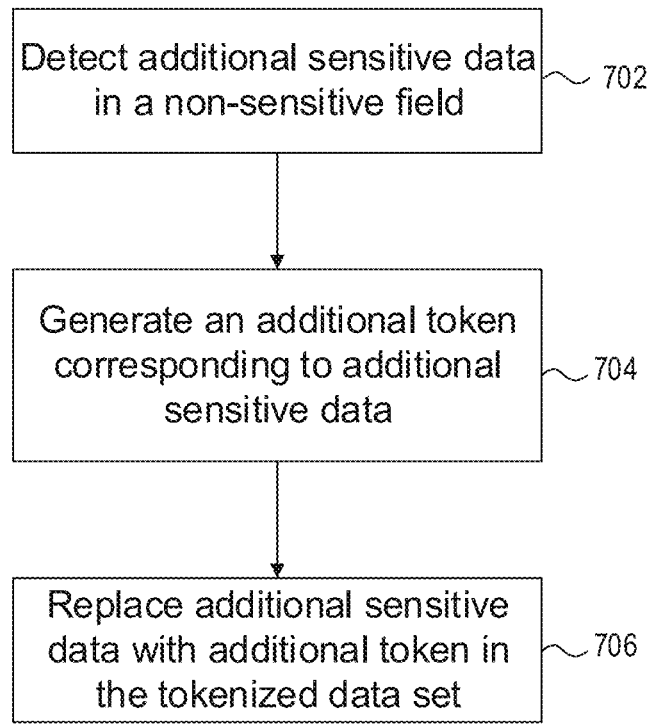
FIG. 7 is a flow chart for a method of detecting additional sensitive data in accordance with one or more illustrative aspects discussed herein.

FIG. 7 is a flow chart for a method 700 of detecting additional sensitive data in accordance with one or more illustrative aspects discussed herein. For the purposes of clarity, FIG. 7 is described with reference to FIGS. 2A, 2B, and 3, but it should be understood that method 700 is not limited to being performed by the systems illustrated therein. A schema may have structural information as for what fields contain sensitive data, and identifying and extracting sensitive data may be based on the schema. However, in some cases, there may be additional sensitive data mixed in non-sensitive data fields (e.g., "notes" field). Another instance is, clients may have input some sensitive data inadvertently when the record is collected. Therefore, the method 400 of data tokenization may further comprise the method 700 to check for additional sensitive data at 702 in a non-sensitive field. Checking for additional sensitive data at 702 may be implemented by the tokenization service controller 206, and it may be achieved by matching non-sensitive field strings with a sensitive data format. If additional sensitive data is detected, the tokenization service controller 206 may generate an additional token at 704 or the tokenization service controller may call the token generator 210 to generate an additional token at 704 corresponding to the additional sensitive data. And the tokenization service controller 206 may further replace the additional sensitive data with the additional token at 706 in the tokenized data set 230.

Figure 8:
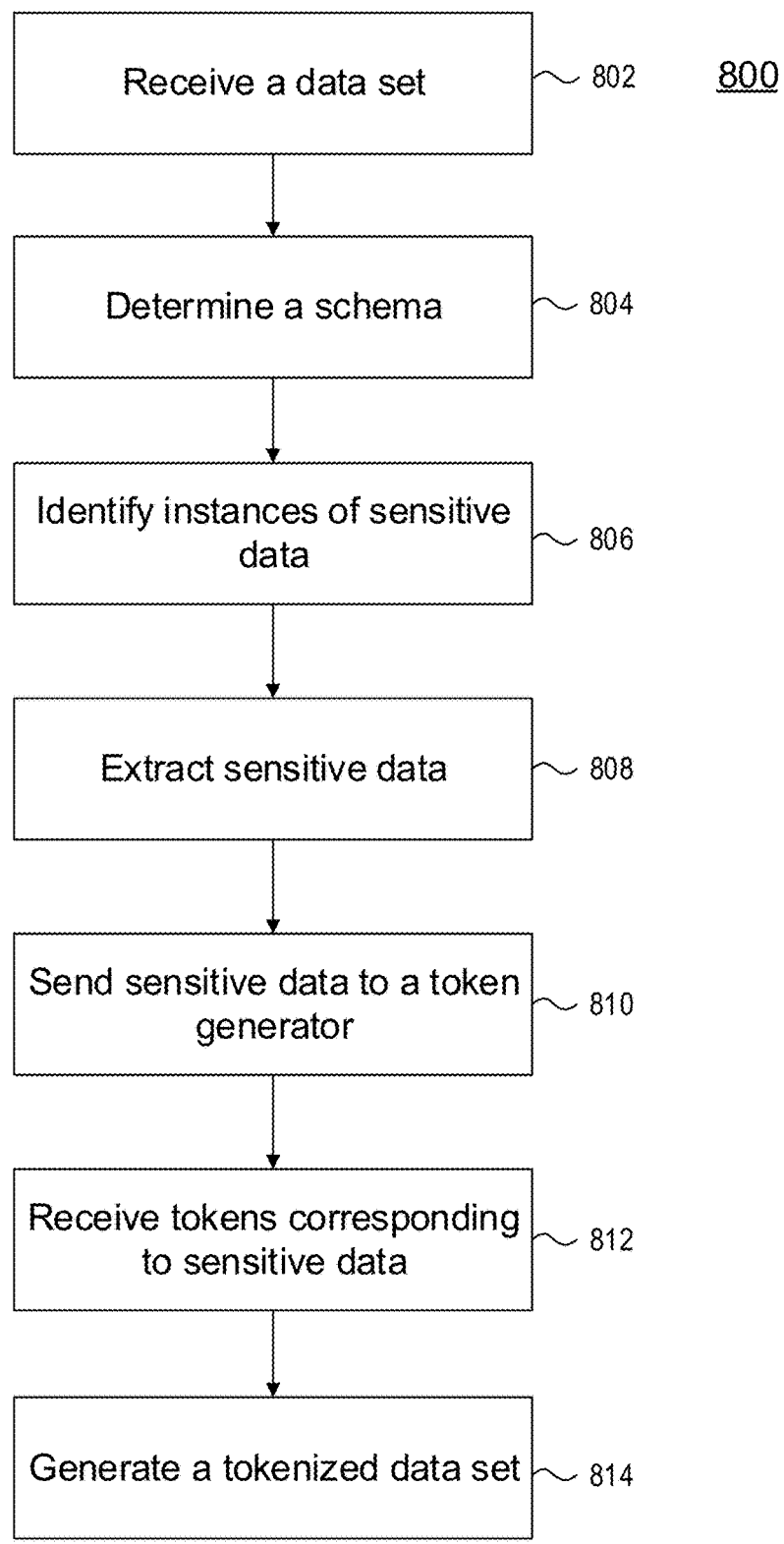
FIG. 8 is a flow chart for a method of data tokenization by a token generator in accordance with one or more illustrative aspects discussed herein.

FIG. 8 is a flow chart for a method 800 of data tokenization in accordance with one or more illustrative aspects discussed herein. For the purposes of clarity, FIG. 8 is described with reference to FIGS. 2A, 2B, and 3, but it should be understood that method 800 is not limited to being performed by the systems illustrated therein. At 802, the wrapper process 320 component may receive an un-tokenized data set 220 comprising a plurality of records 222 arranged according to a format, wherein each of the records 222 comprises one or more fields 224. At 804, the tokenization service controller 206 or the data parser 208 may determine a schema of the received data set 220, the schema identifying which of the one or more fields contains sensitive data. Determining the schema may be implemented by the method 404. At 806, the tokenization service controller 206 may identify instances of sensitive data in the received data set 220, for each record 222 in the plurality of records 222 and based on the determined schema. At 808, the tokenization service controller 206 may extract the identified sensitive data from the one or more records 222 in the received data set 220. Extracted sensitive data may be validated by the method 408. At 810, the tokenization service controller 206 may call the tokenization service 330 component, and send one or more instances of sensitive data to a remote token generator 210, the remote token generator 210 comprising an encryption system equipped with specialized software and/or applications that are configured to encrypt individual values as tokens. At 812, the tokenization service controller 206 may receive tokens corresponding to the one or more instances of sensitive data from the remote token generator 210. At 814, the wrapper process 320 component or the tokenization service controller 206 may generate a tokenized data set 230 comprising a plurality of tokenized records arranged according to the same format as the un-tokenized data set 220, wherein the tokenized records use the one or more generated tokens in place the of the sensitive data, and wherein the tokenized data set conforms to the determined schema. This method 800 may be implemented by the tokenization service controller 206. The tokenization service controller 206 may engage the data parser 208 if the configuration file 226 is too compressed or difficult to determine the schema from, and the token generator 210. The data parser 208 and the token generator 210 may be remote from the tokenization service controller 206. The data parser 208 may be equipped with specialized software and/or applications for parsing, decompressing, or converting configuration files 226. The token generator 210 may be equipped with specialized software and/or applications for generating tokens. The method 800 may further comprise validating the values stored in the identified fields by comparing a format of the values to one or more known sensitive data formats according to the method 408. In response to a failure to validate a value stored in the identified fields, an original value in the corresponding field may be stored in the tokenized data set 230. The tokenized data set 230 may conform to the determined schema. The method 800 may further comprise extracting sensitive values from non-sensitive fields (e.g., "notes" field) according to the method 700.

Figure 9:
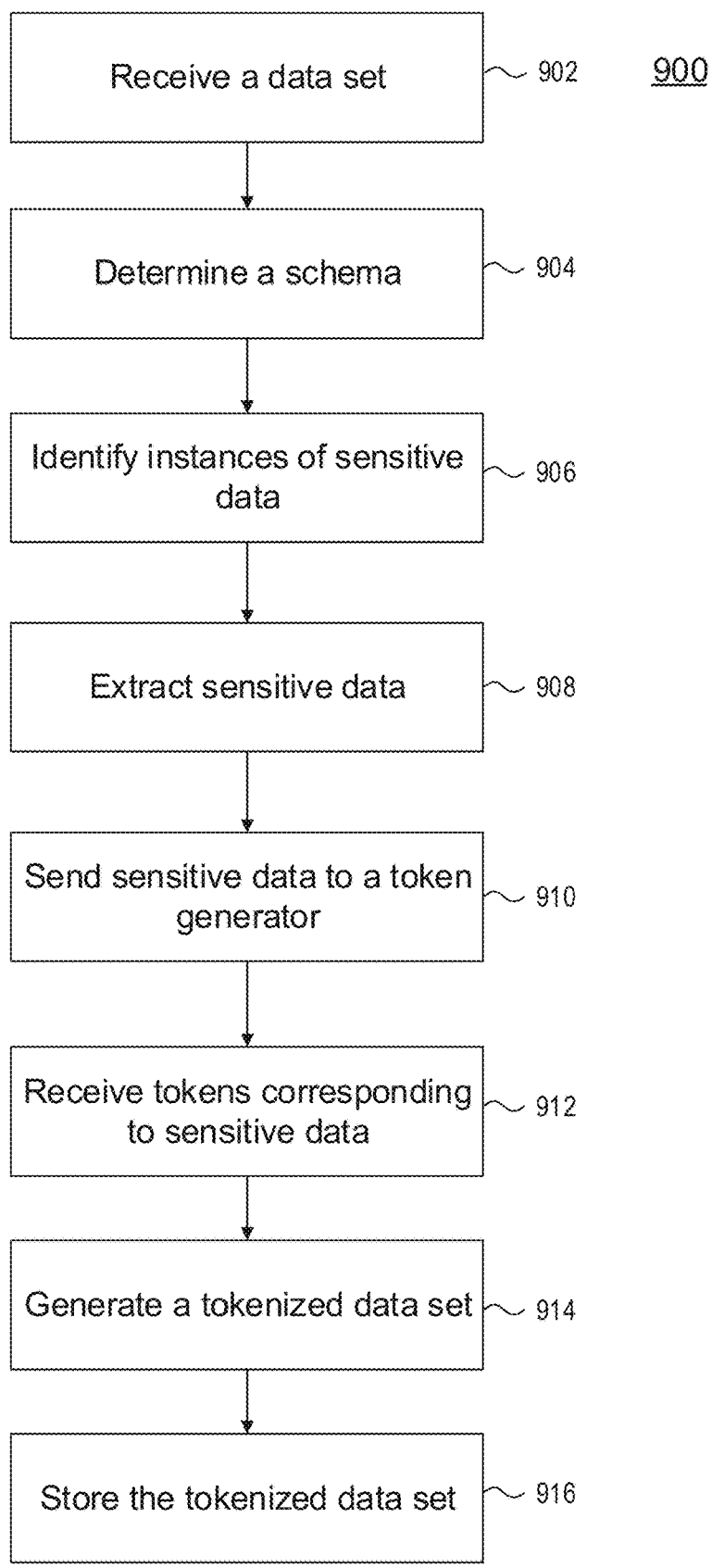
FIG. 9 is a flow chart for a method of data tokenization and storage in accordance with one or more illustrative aspects discussed herein.

FIG. 9 is a flow chart for a method 900 of data tokenization in accordance with one or more illustrative aspects discussed herein. For the purposes of clarity, FIG. 9 is described with reference to FIGS. 2A, 2B, and 3, but it should be understood that method 900 is not limited to being performed by the systems illustrated therein. At 902, the wrapper process 320 component may receive a data set 220 comprising a plurality of records 222 arranged according to a format, wherein each of the records 222 comprises one or more fields 224. At 904, the tokenization service controller 206 or the data parser 208 may determine a schema of the received data set 220, the schema identifying which of the one or more fields 224 contains sensitive data. Determining the schema may be implemented with the method 404. At 906, the tokenization service controller 206 may identify instances of sensitive data in the received data set 220, for each record 222 in the plurality of records 222 and based on the determined schema. At 908, the tokenization service controller 206 may extract the identified sensitive data from the one or more records 222 in the received data set 220. Extracted sensitive data may be validated with the method 408. At 910, the tokenization service controller 206 may send one or more instances of sensitive data to a remote token generator 210, the remote token generator 210 comprising an encryption system equipped with specialized software and/or applications that are configured to encrypt individual values as tokens. At 912, the tokenization service controller 206 may receive tokens corresponding to the one or more instances of sensitive data from the remote token generator 210. At 914, the tokenization service controller 206 may generate a tokenized data set 230 comprising a plurality of tokenized records arranged according to the same format as the un-tokenized data set 220, wherein the tokenized records use the one or more generated tokens in place of the of the sensitive data, and wherein the tokenized data set conforms to the determined schema. At 916, the tokenization service controller 206 may store the tokenized data set 230 in a remote tokenized data store 212. This method 900 may be implemented by the tokenization service controller 206. The tokenization service controller may engage the data parser 208 if a configuration file 226 is too compressed or difficult to determine the schema from, and the token generator 210. The data parser 208 and the token generator 210 may be remote from the tokenization service controller 206. The data parser 208 may be equipped with specialized software and/or applications for parsing, decompressing, or converting configuration files 226. The token generator 210 may be equipped with specialized software and/or applications for generating tokens. The method 900 may further comprise validating the values stored in the identified fields by comparing a format of the values to one or more known sensitive data formats according to the method 408. In response to a failure to validate a value stored in the identified fields, an original value in the corresponding field may be stored in the tokenized data set 230. The method 900 may further comprise detecting additional sensitive data in an unidentified field (e.g., "notes" field); generating an additional token corresponding to the additional sensitive data; and replacing the additional sensitive data with the additional token in the tokenized data set 230.

Figure 10:
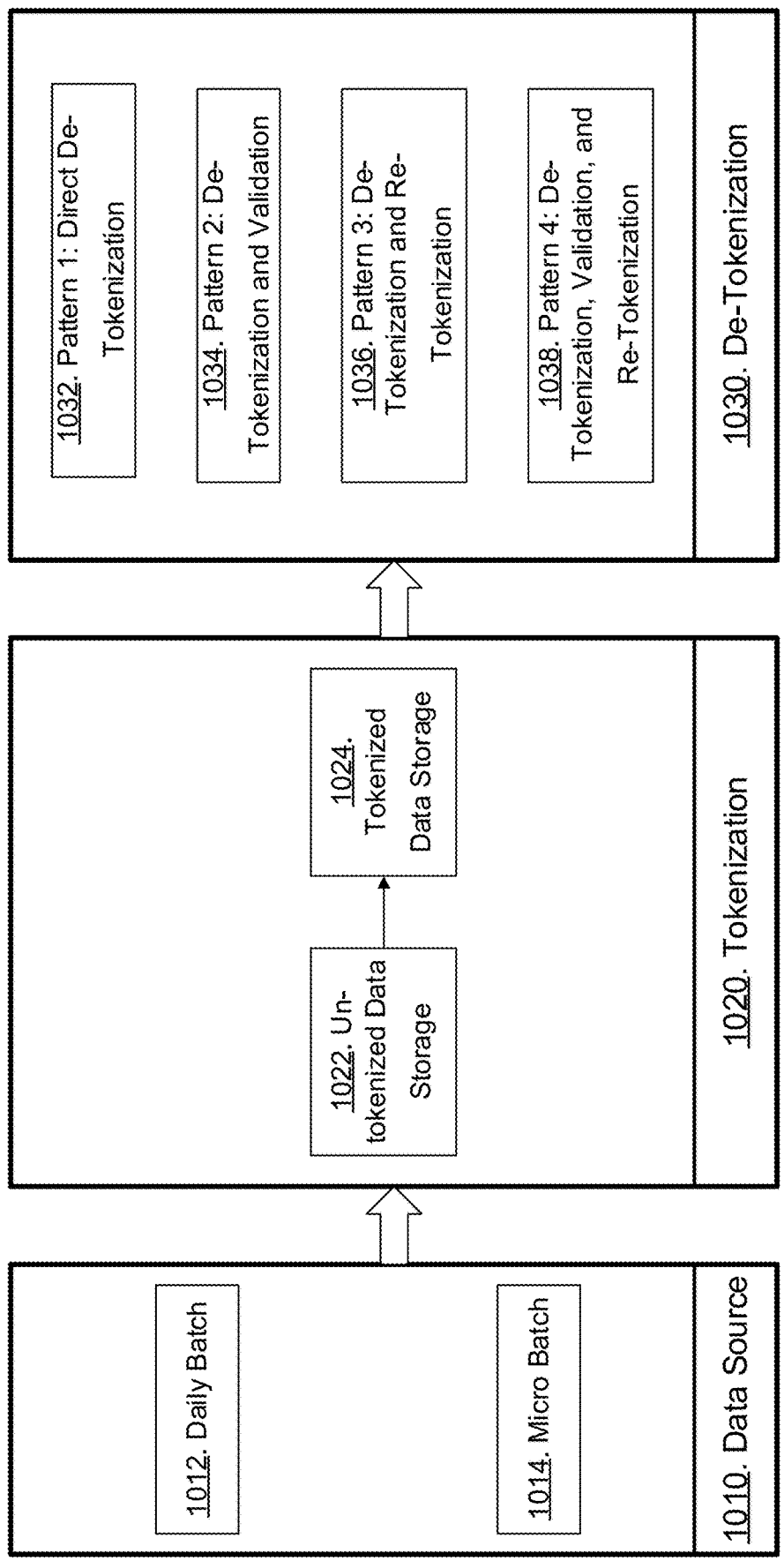
FIG. 10 is a data migration chart from data source, to tokenization, to de-tokenization in accordance with one or more illustrative aspects discussed herein.

FIG. 10 is a data migration chart from data source, to tokenization, to de-tokenization in accordance with one or more illustrative aspects discussed herein. Data may be collected from data source 1010. Data may then be stored with added protection by the process of tokenization 1020. However, tokenized data may not be directly useful. A de-tokenization 1030 process may be required to share or use the data.

Data source 1010 may be a source where data is collected for storage. Data source 1010 may be data submitted by consumers and enterprises. Data source 1010 may be data processed by software vendors for the banking institutions. The data from the data source 1010 may be submitted by a client on a job basis. Or the data from the data source 1010 may be batched to be tokenized based on predetermined time intervals. The batch may be a daily batch 1012 with a 24-hour time interval between each batch. The batch may also be a micro batch 1014 with a shorter time interval, for instance, 6-hour, 1-hour, 15-minute, etc.

Tokenization 1020 may provide added protection to the data collected from the data source 1010. Through a tokenization 1020 process, data may be moved from an un-tokenized data storage 1022 to a tokenized data storage 1024. Both data storages 1022 and 1024 may be associated with some standard security features (e.g., physical restriction of access, authorization, authentication, key management system, etc.). Both un-tokenized data storage 1022 and tokenized data storage 1024 may be a physical or virtualized data storage, or a public or private cloud data storage. Tokenization makes sure that if there is a data breach, sensitive data may not be directly exposed because they have been replaced by tokens with random strings, thus providing added protection. Tokenization 1020 may be implemented with the methods 400, 800, and 900. Tokenization 1020 may be implemented by the systems depicted in FIGS. 2A, 2B, and 3 (e.g., the tokenization service controller 206, the data parser 208, the token generator 210, the wrapper process component 320, the tokenization service component 330, etc.), but it should be understood that tokenization 1020 is not limited to being performed by the systems illustrated therein.

Tokenized data may not be readily sharable or usable because they have been replaced with tokens. The tokens may have random strings different from the original sensitive data. There may be a number of situations where tokenized data may be de-tokenized. Accordingly, there may be several patterns how de-tokenization 1030 may be implemented. Batch de-tokenization may be implemented. Or de-tokenization may be implemented on request.

Pattern 1 may be a direct de-tokenization process 1032. The purpose is to reveal the original sensitive data so that such data may be operated on. For instance, tokenized data file 230 may be de-tokenized so that sensitive data may be shared with software vendors before software vendors may be able to operate on the sensitive data for the banking institutions.

Pattern 2 may be a de-tokenization and validation process 1034. The purpose is to reveal the original sensitive data so that such data may be validated. For instance, stored data may be corrupted, compromised, or deteriorated over time. A periodic validation may be necessary to maintain data health. After de-tokenization, data may be validated according to a set of validation rules. The validation rules may be set based on known sensitive data formats. The frequency of validation may be set by the banking institutions, consumers, businesses, software vendors, data storage vendors, etc. One of the validation methods is shown in the method 408.

Pattern 3 may be a de-tokenization and re-tokenization process 1036. The purpose is to reveal the original sensitive data so that such data may be readily used, but after use, it may be desirable to re-tokenize the data so that the data may be stored again with added protection. For instance, a client may need to access their credit card number from a cloud storage to make an online purchase, which may require a de-tokenization. After the purchase, the client may need to store the credit card number again on the cloud storage, which may require a re-tokenization.

Pattern 4 may be a de-tokenization, validation, and re-tokenization process 1038. The purpose is to reveal the original sensitive data so that such data may be validated and readily used, but after use, it may be desirable to re-tokenize the data so that the data may be stored again with added protection. For instance, a business may need to access all of their employees' social security numbers from a cloud storage for a certain operation, which may require a de-tokenization. However, it may be beneficial to validate the data before the operation since a periodic validation may not have been done for some time. After the validation and operation, the business may need to store the social security numbers again on the cloud storage, which may require a re-tokenization.

Figure 11A:
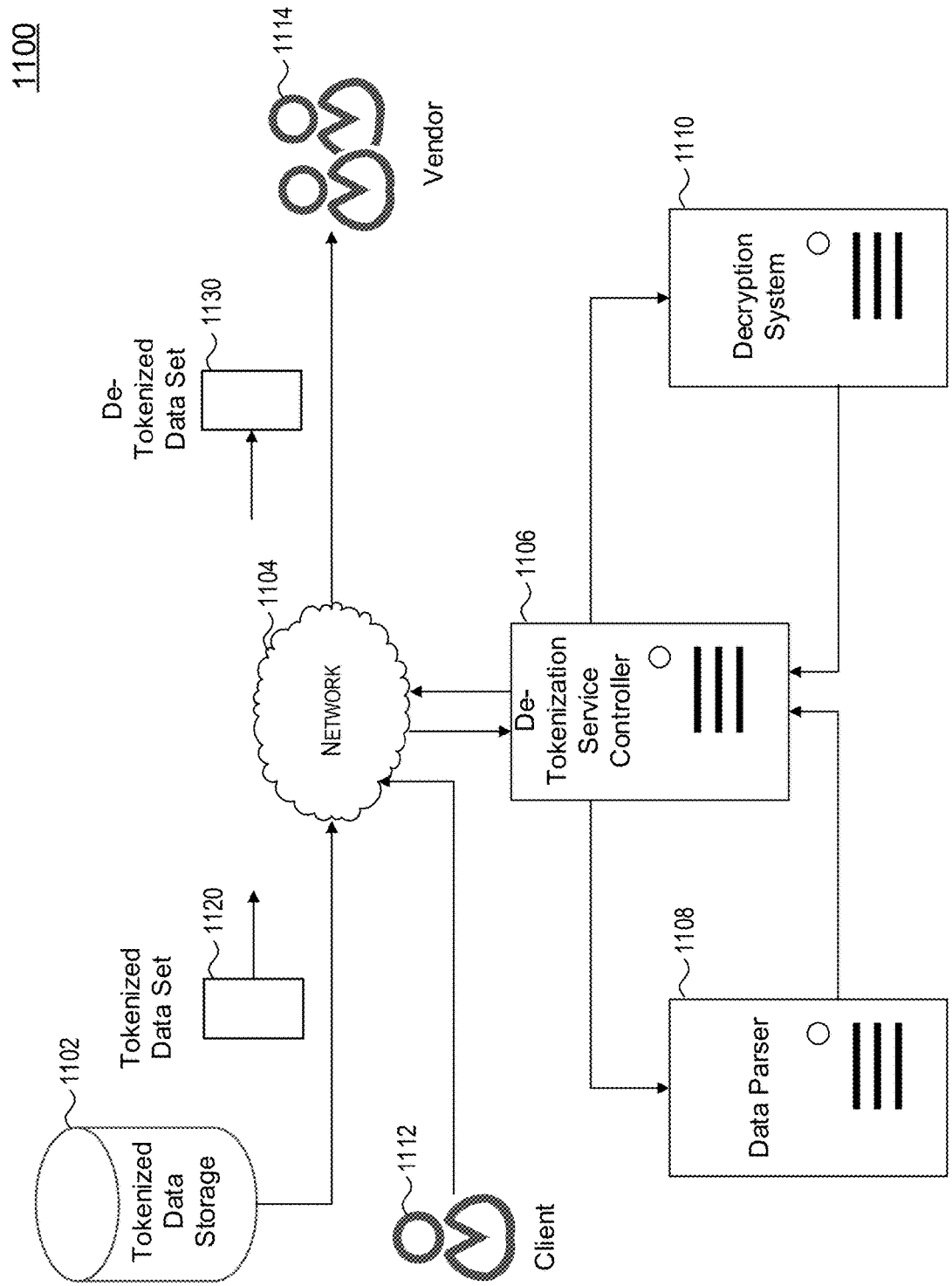
FIG. 11A depicts an example architecture of a system that may be used in implementing data de-tokenization in accordance with one or more illustrative aspects discussed herein.

FIG. 11A depicts an example architecture of a system 1100 that may be used in implementing data de-tokenization in accordance with one or more illustrative aspects discussed herein. The system 1100 may be used for pattern 1 of the de-tokenization service 1032. The system 1100 may generally comprise a tokenized data storage 1102, a network 1104, a de-tokenization service controller 1106, a data parser 1108, and a decryption system 1110.

Figure 11B:
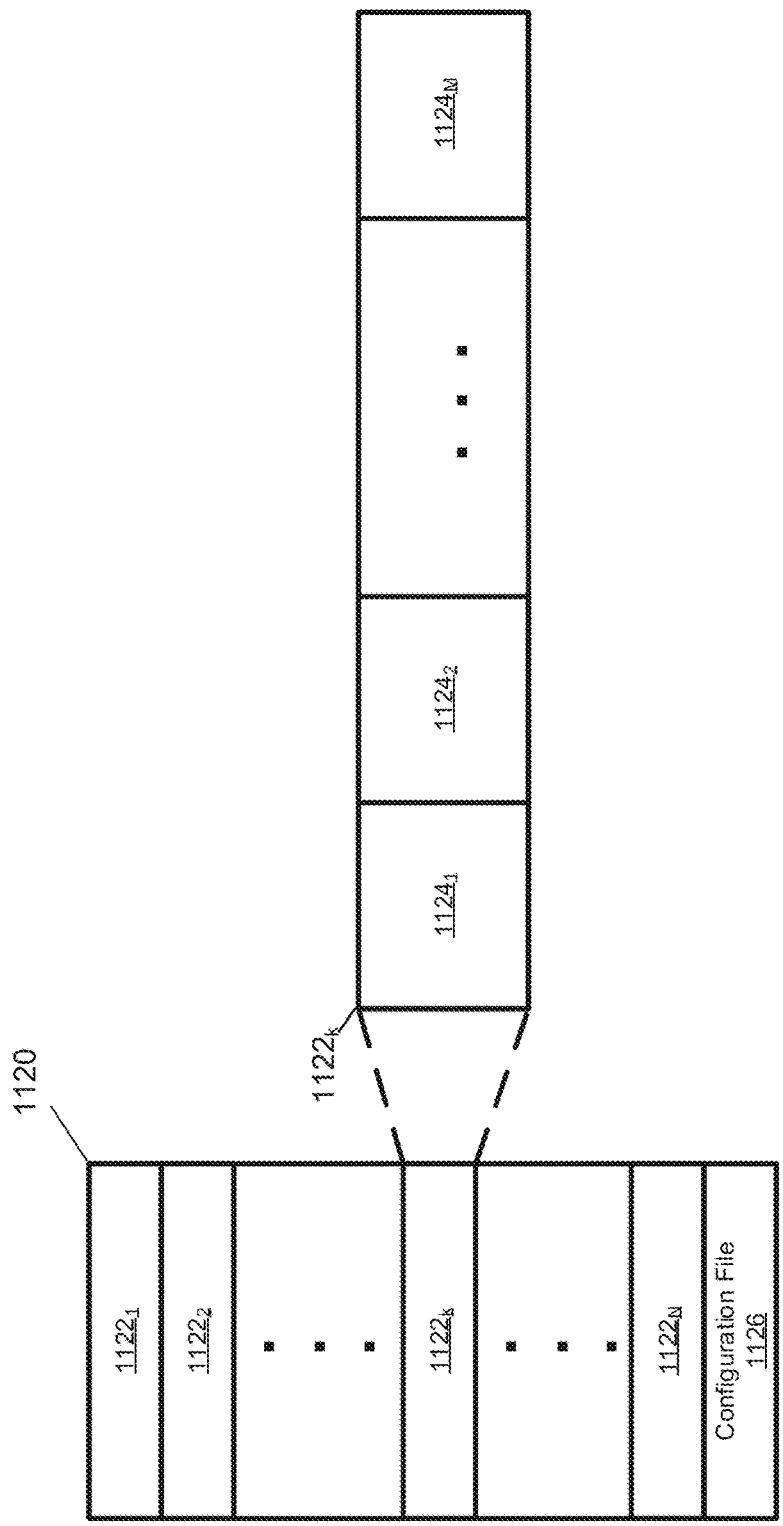
FIG. 11B illustrates a set of tokenized records according to one or more illustrative aspects discussed herein.

The tokenized data storage 1102 may store tokenized data files 1120. The tokenized data files 1120 may comprise a plurality of records 1122 arranged according to a format. For example, as shown in FIG. 11B, the tokenized data files 1120 may contain a number of different records ($1122_1$, $1122_2$, . . . $1122_N$, collectively referred to herein as "records 1122"). The tokenized data files 1120 may also contain a configuration file 1126 that defines, for example, a schema associated with the tokenized data files 1120 or other relevant data about the tokenized data files 1120. Furthermore, each record 1122 may contain a number of fields 1124. For example, as shown in FIG. 11B, arbitrary record $1122_k$ includes a number of fields $1124_1$, $1124_2$, . . . , $1124_M$ (collectively referred to herein as "fields 1124"). For ease of explanation, the records 1122 have been depicted as one dimensional arrays. However, the present disclosure should not be understood to be so limited—indeed any suitable format could be used for the records according to the various embodiments described herein. For example, the records 1122 could be in EXCEL, WORD, TXT, ZIP, BZ2, JSON, DYNAMIC JSON, XML, HTML, PARQUET, AVRO, ORC, etc., to name a few non-limiting examples. Tokens have replaced the sensitive data fields in the tokenized data files 1120. There may be a number of standard security features (e.g., physical restriction of access, authorization, authentication, key management system, etc.) associated with the tokenized data storage 1102. But the tokens add additional protection to the sensitive data. The tokenized data storage 1102 may be a physical or virtualized data storage, or a public or private cloud data storage. Even if the security features are compromised and there is a data breach, there is added protection against exposing the stored data because the sensitive data has been replaced by tokens with random strings.

De-tokenization service 1032 may be initiated on request by a client 1112. The client 1112 may submit a job request through the network 1104 to a de-tokenization service controller 1106. Or a job may be initiated by a request or by a predetermined time interval for batch de-tokenization. For instance, a batch of data files 1120 may need to be shared with software vendors 1114 to process the data files 1120, or a batch of data files 1120 may need to be accessed by a business vendor 1114. The request for batch de-tokenization may be submitted through the network 1104 to the de-tokenization service controller 1106. Or a predetermined time interval may trigger batch de-tokenization. The predetermined time interval may be 24 hours, 6 hours, 1 hour, 15 minutes, etc. Batch de-tokenization may also be triggered by a predetermined number of data records that have yet to be processed.

The de-tokenization service controller 1106 may receive a request to access data stored in a tokenized file 1120 which includes a plurality of records 1122. Each record may contain one or more fields 1124. Some fields 1124 may contain tokenized data (i.e., sensitive data replaced by tokens), and some fields 1124 may contain non-tokenized data. In some embodiments, the de-tokenization service controller 1106 may need to retrieve the tokenized file 1120 from a remote data store such as the tokenized data storage 1102.

To be able to determine which of the one or more fields 1124 of each record 1122 contains tokenized data, the de-tokenization service controller 1106 may determine a schema associated with the tokenized file 1120. The schema may have structural information as for what fields 1124 contain tokenized data. The schema may contain information such as the total number of fields 1124, the name of each field 1124 such as type of data (e.g., date, social security number, account number, etc.), the order of the different types of data in each record 1122, the address of each field 1124 and record 1122 in the storage, etc. The de-tokenization service controller 1106 may find a pattern and determine the schema.

In some embodiments, the de-tokenization service controller 1106 may instruct a data parser 1108 to determine the schema. The data parser 1108 may be equipped with specialized software and/or applications to parse, decompress, and convert a configuration file 1126, especially when the configuration file 1126 is too compressed or difficult for the de-tokenization service controller 1106 to determine the schema from. In these cases, the data parser 1108 may be engaged to parse, decompress, or convert associated configurations files 1126. In some embodiments, the data parser 1108 may house a database containing historic records that may have the same schema with a querying record 1122. The de-tokenization service controller 1106, or the data parser 1108 may query the database to check for a match between a querying record 1122 and a historic record. If there is a match, the de-tokenization service controller 1106, or the data parser 1108 may determine the same schema exists for the querying record 1122 as the historic record.

After determining the schema, the de-tokenization service controller 1106 may extract instances of tokenized data from the one or more fields 1124 in each record 1122 of the file 1120 by identifying the instances of tokenized data. In some embodiments, the extraction of tokenized data may comprise extracting tokenized data from only part of the file 1120. This may save processing power by focusing on parts of the files 1120 that are of interest to the vendors 1114 or clients 1112. This may also reduce risks of exposing other parts of the files 1120 unnecessary for being de-tokenized.

After extracting the identified tokenized data, the de-tokenization service controller 1106 may decrypt the tokens itself. The de-tokenization service controller 1106 may also instruct a decryption system 1110 to decrypt the tokens. The de-tokenization service controller 1106 may send one or more instances of tokenized data to the decryption system 1110. The decryption system 1110 may be equipped with specialized software and/or applications that are configured to decrypt the tokens. After decrypting the tokens, the decryption system 1110 may then send decrypted sensitive values back to the de-tokenization service controller 1106. The decryption system 1110 may be remote from the de-tokenization service controller 1106.

The de-tokenization service controller 1106 may then generate a de-tokenized data set 1130 comprising a plurality of records, corresponding to the plurality of received tokenized records 1120, using the decrypted sensitive values in place of the instances of tokenized data. The de-tokenized data set 1130 may conform to the same format as the original tokenized data set 1120. The de-tokenized data file 1130 may then be shared with vendors 1114, or be used by clients 1112. In some embodiments, the de-tokenization service controller 1106 may further send the de-tokenized file 1130 to a destination. The destination may be a vendor 1114 address, or a client 1112 address. The destination may alternatively or additionally be a storage.

Figure 12:
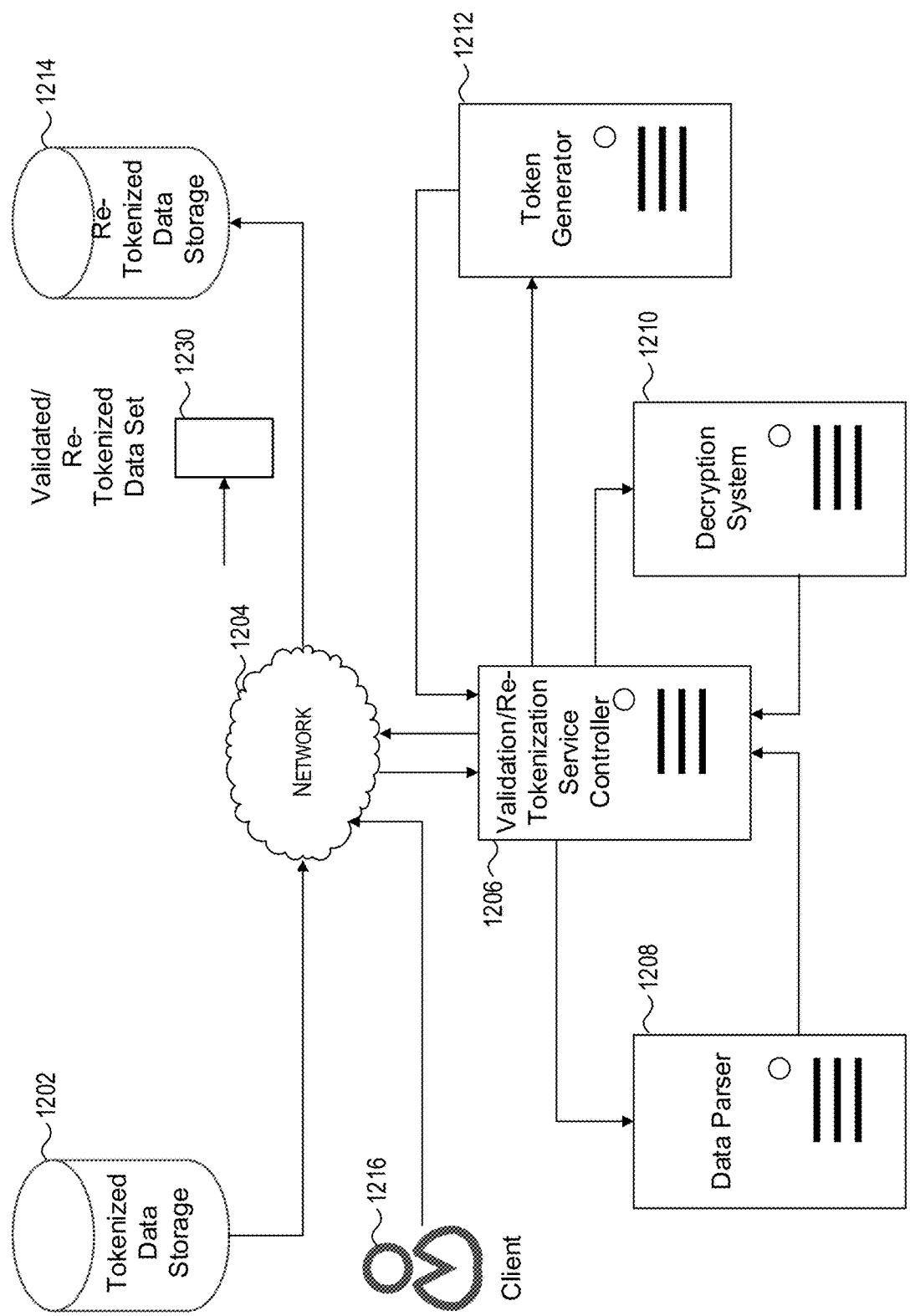
FIG. 12 depicts an example architecture of a system that may be used in implementing data de-tokenization, validation, and re-tokenization in accordance with one or more illustrative aspects discussed herein.

FIG. 12 depicts an example architecture of a system 1200 that may be used in implementing data de-tokenization, validation, and re-tokenization in accordance with one or more illustrative aspects discussed herein. The system 1200 may be used for pattern 1, 2, 3, or 4 of the de-tokenization service 1032, 1034, 1036, or 1038. Similar with the system 1100 for implementing pattern 1 only, the system 1200 for implementing any of the patterns 1, 2, 3, and 4 may also generally comprise a tokenized data storage 1202, a network 1204, a data parser 1208, and a decryption system 1210. Additionally, the system 1200 may comprise a token generator 1212, a re-tokenized data storage 1214, and instead of a de-tokenization service controller 1106, the system 1200 may comprise a validation/re-tokenization service controller 1206.

The validation/re-tokenization service controller 1206 may control a de-tokenization process in a similar way as the system 1100, and the validation/re-tokenization service controller 1206 may additionally control a validation process and a re-tokenization process.

To implement a validation process, the validation service controller 1206 may check the validation of decrypted sensitive values based on a set of validation rules. The validation rules may be based on formats of known sensitive data formats. For instance, a social security number may have 9 numerical digits, a credit card number may have 16 numerical digits, etc. One of the validation methods is shown in the method 408. After validation, the validation service controller 1206 may generate a validated file 1230, arranged in the same format as the de-tokenized data file 1130, by adding one or more fields to the de-tokenized file 1130 indicating the results of the validation check. The frequency of validation may be set by the banking institutions, consumers, businesses, software vendors, data storage vendors, etc.

To implement a re-tokenization process, the re-tokenization service controller 1206 may generate tokens itself for the decrypted sensitive values in the de-tokenized file 1130. Or the re-tokenization service controller 1206 may instruct a token generator 1212 to generate tokens. The token generator 1212 may be remote from the re-tokenization service controller 1206, and may comprise an encryption system configured to encrypt individual values as tokens. The re-tokenization service controller 1206 may send the decrypted sensitive values in the de-tokenized file 1130 to the token generator 1212. After the token generator generates the tokens, the token generator 1212 may then send tokens corresponding to the decrypted sensitive values to the re-tokenization service controller 1206. After receiving the tokens, the re-tokenization service controller 1206 may generate a re-tokenized data file 1230 with the same format as the de-tokenized file 1130, by replacing the decrypted sensitive values with the re-tokenized values. The re-tokenization service controller 1206 may further store the re-tokenized data files 1230 in a data store such as the re-tokenized data storage 1214. The re-tokenization process may be implemented similarly with the tokenization process by the methods of 400, 800, and 900.

To implement a validation and re-tokenization process, the validation/re-tokenization service controller 1206 may validate the decrypted sensitive values in the de-tokenized file 1130 based on a set of validation rules, and generate tokens itself or through a token generator 1212 for the decrypted sensitive values. After generating or receiving the tokens, the validation/re-tokenization service controller 1206 may generate a re-tokenized validated data file 1230 with the same format as the de-tokenized file 1130, by replacing the decrypted sensitive values with the re-tokenized values, and by adding one or more fields to the de-tokenized file 1130 indicating the results of the validation check. The validation/re-tokenization service controller 1206 may further store the re-tokenized validated data files 1230 in a data store such as the re-tokenized data storage 1214. One of the validation methods is shown in the method 408. The re-tokenization process may be implemented similarly with the tokenization process by the methods of 400, 800, and 900.

Figure 13:
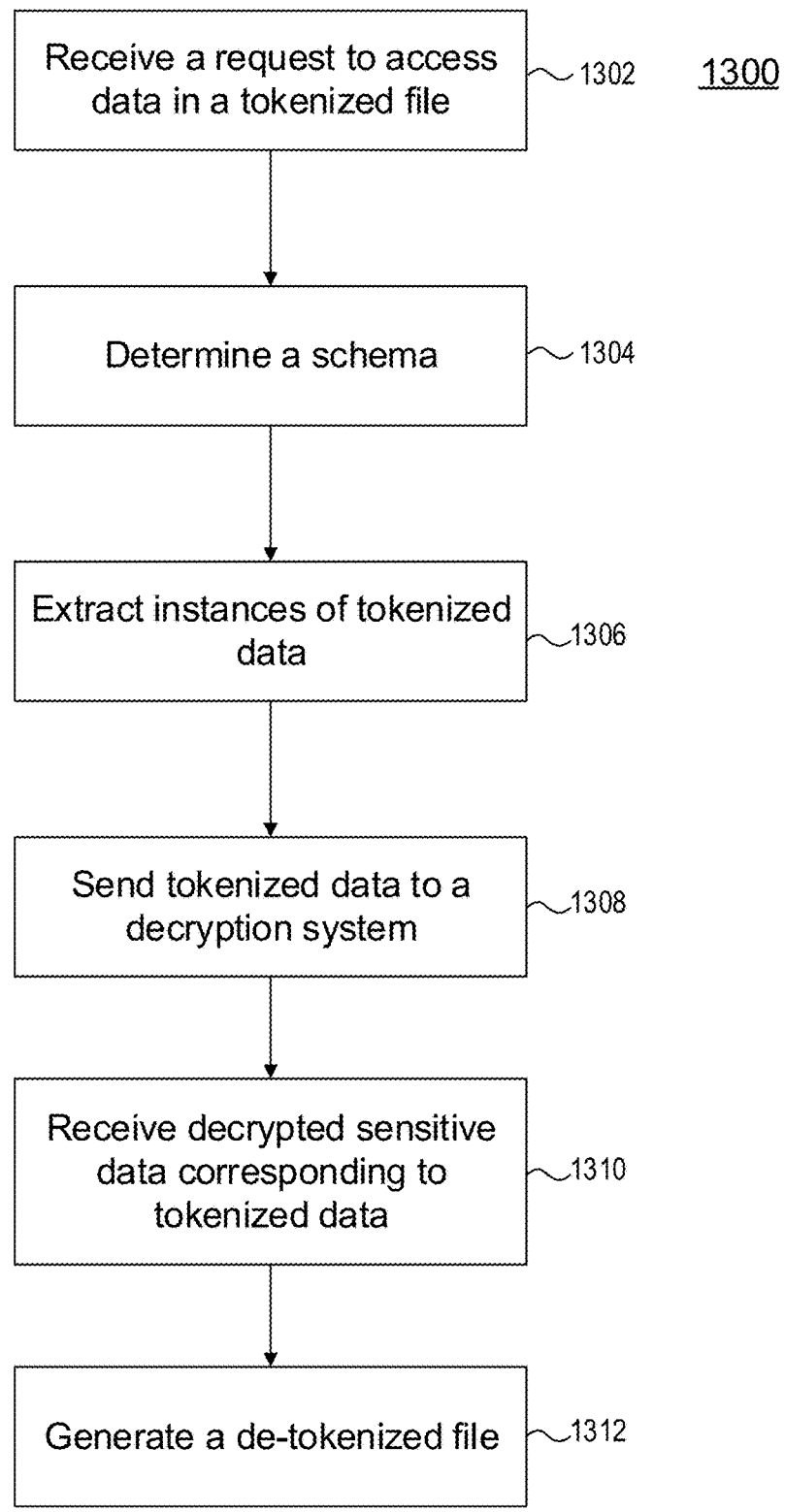
FIG. 13 is a flow chart for a method of data de-tokenization in accordance with one or more illustrative aspects discussed herein.

FIG. 13 is a flow chart for a method 1300 of data de-tokenization in accordance with one or more illustrative aspects discussed herein. For the purposes of clarity, FIG. 13 is described with reference to FIGS. 11A, 11B, and 12, but it should be understood that method 1300 is not limited to being performed by the systems illustrated therein. At 1302, the method 1300 of data de-tokenization may receive a request to access data stored in a tokenized file 1120, the tokenized file 1120 comprising a plurality of records 1122, each record 1122 comprising one or more fields 1124. The one or more fields 1124 may contain tokenized data (i.e., sensitive data replaced with tokens), and/or non-tokenized data. 1302 may be implemented by a de-tokenization service controller 1106 or a validation/re-tokenization service controller 1206. 1302 may further comprise retrieving the tokenized file 1120 from a data store, such as a tokenized data storage 1102 or 1202.

At 1304, the de-tokenization service controller 1106 or the validation/re-tokenization service controller 1206 may determine a schema associated with the tokenized file 1120, wherein the schema identifies which of the one or more fields 1124 of each record 1122 contains tokenized data. Additionally, the de-tokenization service controller 1106 or the validation/re-tokenization service controller 1206 may instruct a data parser 1108 or 1208 to parse, decompress, or convert configuration files 1126 associated with the tokenized data set 1120 to facilitate schema determination. Some configuration files may be difficult to determine the schema from because they may be too compressed or be in a format not readable by the de-tokenization service controller 1106 or the validation/re-tokenization service controller 1206. The data parser 1108 or 1208 may be equipped with specialized software and/or applications to parse, decompress, or convert the configuration files 1126. In some embodiments, the data parser 1108 or 1208 may house a database containing records with the same schema as a querying record 1122. The de-tokenization service controller 1106, the validation/re-tokenization service controller 1206, or the data parser 1108 or 1208 may simply query the database to determine the schema based on a match between a querying record 1122 and a historic record having the same schema. The schema may have structural information as for what fields contain tokenized data. The schema may contain information such as the total number of fields 1124, the name of each field 1124 such as type of data (e.g., date, social security number, account number, etc.), the order of the different types of data in each record 1122, the address of each field 1124 and record 1122 in the storage 1102 or 1202, etc.

At 1306, the de-tokenization service controller 1106 or the validation/re-tokenization service controller 1206 may extract instances of tokenized data from the one or more fields 1124 in the file 1120 by identifying the instances of tokenized data using the determined schema. The identification of instances of tokenized data is based on the schema with structural information as for what fields 1124 contain tokenized data (i.e., sensitive data replaced with tokens). Extracting tokenized data from the identified fields 1124 may also comprise compiling a queue of tokenized data values, and wherein decrypting the one or more tokens comprises sending the tokenized data values compiled in the queue to a decryption system 1110 1210 in an order they are queued. The extraction may also be implemented only on part of the tokenized file 1120, so that it may save processing power by focusing on parts of the files of interest to the vendors 1114 or the clients 1112. By only extracting part of the file 1120, it may also reduce the risks of exposing the sensitive data from other parts of the files unnecessary to be de-tokenized.

At 1308, the de-tokenization service controller 1106 or the validation/re-tokenization service controller 1206 may send instances of tokenized data to a decryption system 1110 or 1210, wherein the decryption system 1110 or 1210 is equipped with specialized software and/or applications that are configured to decrypt the tokens. 1308 may be alternatively or additionally implemented by the de-tokenization service controller 1106 or the validation/re-tokenization service controller 1206. The decryption system 1110 1210 may be remote from the de-tokenization service controller 1106 or the validation/re-tokenization service controller 1206.

At 1310, the de-tokenization service controller 1106 or the validation/re-tokenization service controller 1206 may receive decrypted sensitive values corresponding to the instances of tokenized data from the decryption system 1110 or 1210. 1310 may be implemented by the de-tokenization service controller 1106 or the validation/re-tokenization service controller 1206.

At 1312, the de-tokenization service controller 1106 or the validation/re-tokenization service controller 1206 may generate a de-tokenized file 1130 comprising a plurality of records, corresponding to the plurality of original tokenized records 1122, using the decrypted sensitive values in place of the instances of tokenized data. The de-tokenized data set 1130 may have the same format as the original tokenized data set 1120.

The method 1300 of de-tokenization may further comprise sending the de-tokenized file 1130 to a destination specified by the request. The destination may be a vendor 1114 address, or a client 1112 address. The method 1300 may further comprise validating the de-tokenized file 1130 by checking a set of validation rules, and generating a de-tokenized validated file 1230 by adding one or more fields to the de-tokenized file 1130 indicating the results of the validation check. One of the validation methods is shown in the method 408. The frequency of validation may be set by the banking institutions, consumers, businesses, software vendors, data storage vendors, etc. The validation process may be alternatively or additionally be implemented by the validation service controller 1206. The method 1300 may further comprise sending the de-tokenized validated file to the token generator 1212, receiving tokens corresponding to the instances of decrypted sensitive values, and generating a re-tokenized validated file 1230. The re-tokenized validated data file 1230 may be stored in a remote data store such as the re-tokenized data storage 1214. The re-tokenization process may be alternatively or additionally be implemented by the re-tokenization service controller 1206. The re-tokenization process may be implemented similarly with the tokenization process by the methods of 400, 800, and 900.

Figure 14:
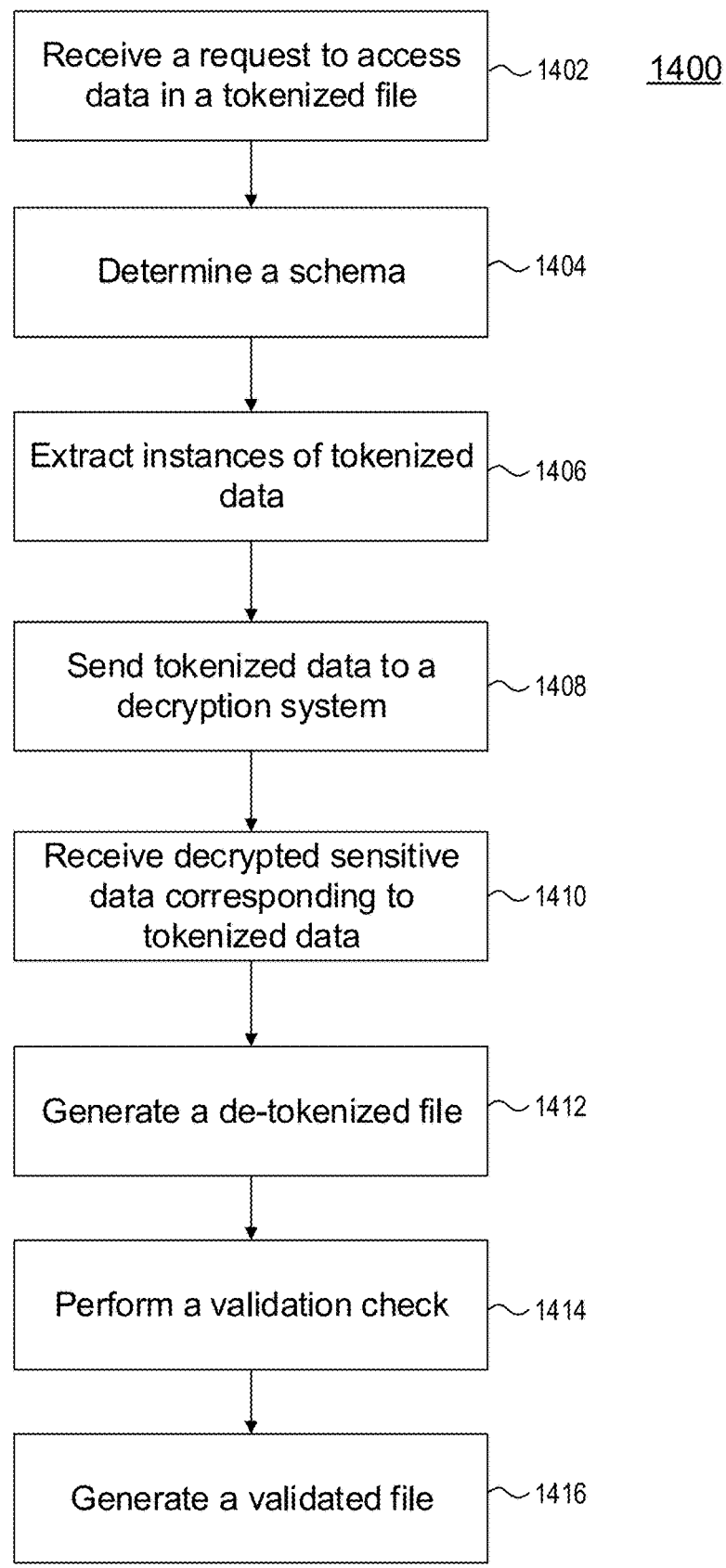
FIG. 14 is a flow chart for a method of data de-tokenization and validation in accordance with one or more illustrative aspects discussed herein.

FIG. 14 is a flow chart for a method 1400 of data de-tokenization and validation in accordance with one or more illustrative aspects discussed herein. For the purposes of clarity, FIG. 14 is described with reference to FIGS. 11A, 11B, and 12, but it should be understood that method 1400 is not limited to being performed by the systems illustrated therein. At 1402, the validation service controller 1206 receives a request to access data stored in a tokenized file 1120, the tokenized file 1120 being arranged in a format and comprising a plurality of records 1122, each record 1122 comprising one or more fields 1124. At 1404, the validation service controller 1206 determines a schema associated with the tokenized file 1120, wherein the schema identifies which of the one or more fields 1124 of each record 1122 contains tokenized data. Determining the schema may be alternatively or additionally implemented by the data parser 1208. The data parser 1208 may be equipped with specialized software and/or applications to parse, decompress, and convert a configuration file 1126 that may be difficult for the validation service controller 1206 to process. The data parser 1208 may also house a database of historic records having the same schema with the querying record 1122, and determining the schema may be based on a match between the querying record 1122 and a historic record. At 1406, the validation service controller 1206 extracts instances of tokenized data from the one or more fields 1124 in the file 1120 by identifying the instances of tokenized data using the determined schema. At 1408, the validation service controller 1206 sends instances of tokenized data to the decryption system 1210, wherein the decryption system 1210 is equipped with specialized software and/or applications that are configured to decrypt the tokens. At 1410, the validation service controller 1206 receives decrypted sensitive values corresponding to the instances of tokenized data from the decryption system 1210. Alternatively, or additionally, the validation service controller 1206 may also decrypt tokenized values itself in the tokenized file 1120. At 1412, the validation service controller 1206 generates a de-tokenized file 1130 arranged in the format and comprising a plurality of records, corresponding to the plurality of records of the tokenized file 1120, using the decrypted sensitive values in place of the instances of tokenized data. At 1414, the validation service controller 1206 performs a validation check on the decrypted values, based on a set of validation rules. The set of validation rules may be stored on the validation service controller 1206. One of the validation methods is shown in the method 408. The frequency of validation may be set by the banking institutions, consumers, businesses, software vendors, data storage vendors, etc. At 1416, the validation service controller 1206 generates a validated file 1230, arranged in the same format as the tokenized file 1120, by adding one or more fields to the de-tokenized file 1230 indicating the results of the validation check. This method 1400 may be implemented by the validation service controller 1206, where the validation service controller 1206 may engage the data parser 1208 in determining the schema, and the decryption system 1210 in decrypting the tokens in the tokenized file 1120. The method 1400 may further comprise retrieving the tokenized file 1120 from a remote data store such as the tokenized data storage 1202. The method 1400 may further comprise generating a re-tokenized validated file 1230 by replacing decrypted sensitive values with re-tokenized values. The re-tokenization process may be implemented similarly with the tokenization process by the methods of 400, 800, and 900. The tokenized file 1120, the de-tokenized file 1130, and the validated file 1230 may all conform to the same format as the original un-tokenized file 220.

Figure 15:
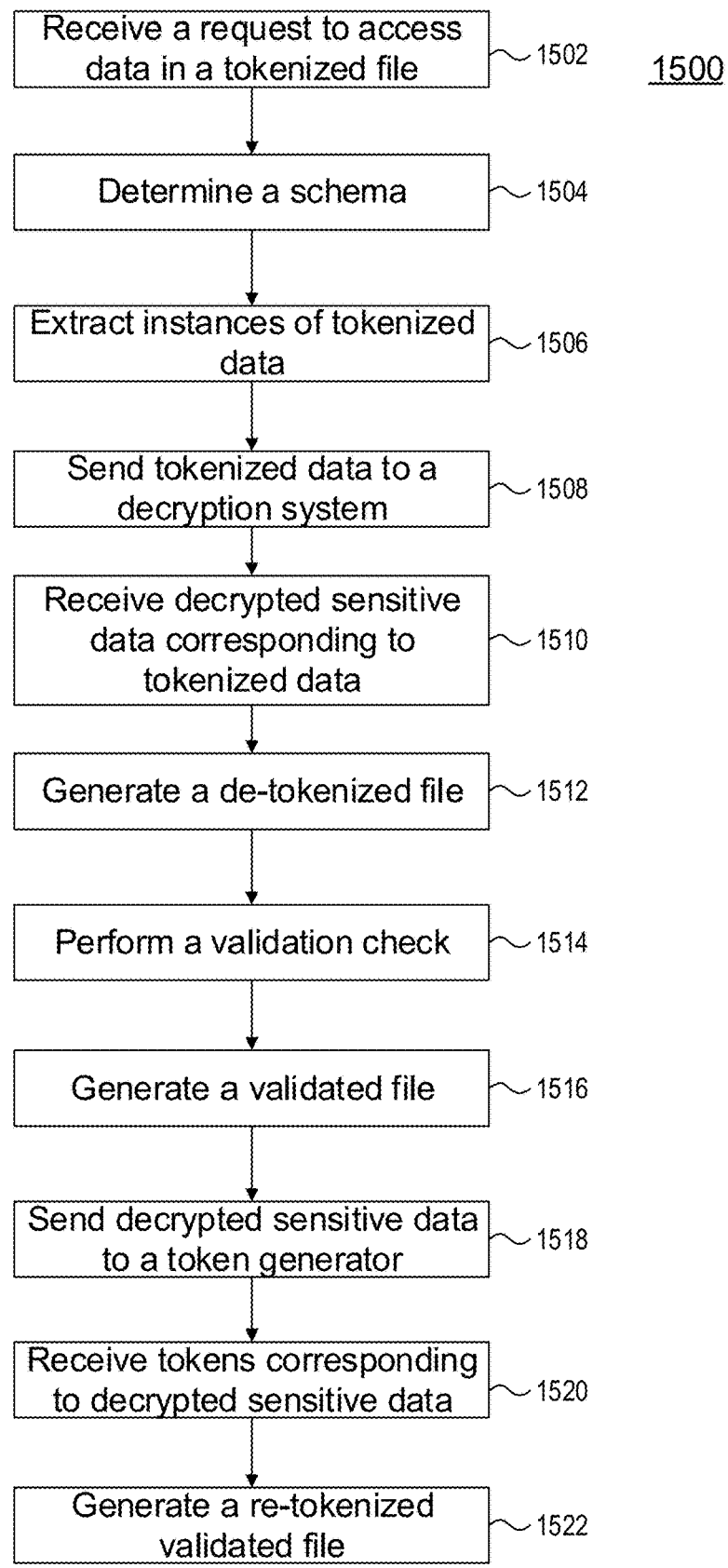
FIG. 15 is a flow chart for a method of data de-tokenization, validation, and re-tokenization in accordance with one or more illustrative aspects discussed herein.

FIG. 15 is a flow chart for a method of data de-tokenization, validation, and re-tokenization in accordance with one or more illustrative aspects discussed herein. For the purposes of clarity, FIG. 15 is described with reference to FIGS. 11A, 11B, and 12, but it should be understood that method 1500 is not limited to being performed by the systems illustrated therein. At 1502, the re-tokenization service controller 1206 receives a request to access data stored in a tokenized file 1120, the tokenized file 1120 being arranged in a format and comprising a plurality of records 1122, each record 1122 comprising one or more fields 1124. At 1504, the re-tokenization service controller 1206 determines a schema associated with the tokenized file 1120, wherein the schema identifies which of the one or more fields 1124 of each record 1122 contains tokenized data. Determining the schema may be alternatively or additionally implemented by the data parser 1208. The data parser 1208 may be equipped with specialized software and/or applications to parse, decompress, and convert a configuration file 1126 that may be difficult for the validation service controller 1206 to process. The data parser 1208 may also house a database of historic records having the same schema with the querying record 1122, and determining the schema may be based on a match between the querying record 1122 and a historic record. At 1506, the re-tokenization service controller 1206 extracts instances of tokenized data from the one or more fields 1124 in the file 1120 by identifying the instances of tokenized data using the determined schema. At 1508, the re-tokenization service controller 1206 sends instances of tokenized data to the decryption system 1210, wherein the decryption system 1210 is equipped with specialized software and/or applications that are configured to decrypt the tokens. Alternatively, or additionally, the re-tokenization service controller 1206 may also decrypt tokenized values in the tokenized file 1120. At 1510, the re-tokenization service controller 1206 receives decrypted sensitive values corresponding to the instances of tokenized data from the decryption system 1210. At 1512, the re-tokenization service controller 1206 generates a de-tokenized file 1130 arranged in the same format as the tokenized file 1120 and comprising a plurality of records, corresponding to the plurality of records of the tokenized file 1120, using the decrypted sensitive values in place of the instances of tokenized data. At 1514, the re-tokenization service controller 1206 performs a validation check on the decrypted values, based on a set of validation rules. The set of validation rules may be stored on the validation service controller 1206. One of the validation methods is shown in the method 408. The frequency of validation may be set by the banking institutions, consumers, businesses, software vendors, data storage vendors, etc. At 1516, the re-tokenization service controller 1206 generates a validated file 1230, arranged in the same format as the de-tokenized file 1130, by adding one or more fields to the de-tokenized file 1130 indicating the results of the validation check. At 1518, the re-tokenization service controller 1206 sends the decrypted sensitive values to the remote token generator 1212, the remote token generator 1212 comprising an encryption system equipped with software and/or applications that are configured to encrypt individual values as tokens. At 1520, the re-tokenization service controller 1206 receives tokens corresponding to the decrypted sensitive values from the remote token generator 1212. Alternatively, or additionally, the re-tokenization service controller 1206 may also encrypt de-tokenized sensitive values itself into tokens. At 1522, the re-tokenization service controller 1206 generates a tokenized validated file 1230 by replacing decrypted sensitive values in the de-tokenized file 1130 with tokenized values. This method 1500 may be implemented by the validation service controller 1206, where the validation service controller 1206 may engage the data parser 1208 in determining the schema, the decryption system 1210 in decrypting the tokens, and the token generator 1212 in regenerating tokens from the de-tokenized sensitive values. The re-tokenization process may be implemented similarly with the tokenization process by the methods of 400, 800, and 900. The method 1500 may further comprise storing the re-tokenized validated file 1230 in a remote data store such as the re-tokenized data storage 1214. The tokenized file 1120, the de-tokenized file 1130, the validated file, and the re-tokenized validated file 1230 may all be arranged to the same format as the original un-tokenized file 220.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
receiving a data set comprising a plurality of records arranged according to a format, wherein each of the records comprises one or more fields;
determining a schema of the received data set, the schema identifying which of the one or more fields contains sensitive data;
for each record in the plurality of records, identifying, based on the determined schema, instances of sensitive data in the received data set;
extracting the identified instances of sensitive data from one or more records of the plurality of records in the received data set;
compiling a queue of sensitive data values in an order the identified instances of sensitive data are extracted;
sending, for processing as a batch, the queue of sensitive data values to a token generator;
receiving, from the token generator, a queue of tokens corresponding to the queue of sensitive data values; and
generating a tokenized data set comprising a plurality of tokenized records arranged according to the format, wherein the tokenized records use a respective token of the generated queue of tokens in place of each respective instance of the sensitive data, and wherein the tokenized data set conforms to the determined schema.

2. The method of claim 1, wherein extracting the sensitive data comprises validating values stored in the identified fields by comparing a format of the values to one or more known sensitive data formats.

3. The method of claim 2, wherein, in response to a failure to validate, an original value is stored in the corresponding field in the tokenized data set.

4. The method of claim 1, wherein the token generator comprises a remote encryption system configured to encrypt individual values as tokens.

5. The method of claim 1, wherein determining the schema comprises parsing a configuration file associated with the received data set.

6. The method of claim 1, wherein determining the schema comprises querying a database containing records that identify the schema.

7. The method of claim 1, wherein the received data set is encrypted, and wherein the method further comprises:
  decrypting the received data set; and
  encrypting, after its generation, the tokenized data set.

8. The method of claim 1, further comprising:
  automatically detecting additional sensitive data in a non-sensitive field by comparing values in the non-sensitive filed to pre-determined rules;
  generating an additional token corresponding to the additional sensitive data; and
  replacing the additional sensitive data with the additional token in the tokenized data set.

9. The method of claim 1, further comprising: storing the tokenized data set in a remote data storage.

10. An apparatus comprising:
  one or more processors; and
  memory storing instructions that, when executed by the one or more processors, cause the apparatus to:
    receive a data set comprising a plurality of records arranged according to a format, wherein each of the records comprises one or more fields;
    determine a schema of the received data set, the schema identifying which of the one or more fields contains sensitive data;
    for each record in the plurality of records, identify, based on the determined schema, instances of sensitive data in the received data set;
    extract the identified instances of sensitive data from one or more records of the plurality of records in the received data set;
    compile a queue of sensitive data values in an order the identified instances of sensitive data are extracted;
    send, for processing as a batch, the queue of sensitive data values to a remote token generator, the remote token generator comprising an encryption system configured to encrypt individual values as tokens;
    receive a queue of tokens corresponding to the queue of sensitive data values from the remote token generator; and
    generate a tokenized data set comprising a plurality of tokenized records arranged according to the format, wherein the tokenized records use a respective token of the received queue of tokens in place of each respective instance of the sensitive data, and wherein the tokenized data set conforms to the determined schema.

11. The apparatus of claim 10, wherein the instructions, when executed by the one or more processors, cause the apparatus to validate the values stored in the identified fields by comparing a format of the values to one or more known sensitive data formats.

12. The apparatus of claim 11, wherein the instructions, when executed by the one or more processors cause the apparatus to store, in response to a failure to validate a value stored in the identified fields, an original value in the corresponding field in the tokenized data set.

13. The apparatus of claim 10, wherein the instructions, when executed by the one or more processors, cause the apparatus to determine the schema by parsing a configuration file associated with the received data set.

14. The apparatus of claim 10, wherein the instructions, when executed by the one or more processors, cause the apparatus to determine the schema by querying a database containing records that identify the schema.

15. A non-transitory computer readable medium storing computer instructions that, when executed by one or more processors, cause the one or more processors to:
  receive a data set comprising a plurality of records arranged according to a format, wherein each of the records comprises one or more fields;
  determine a schema of the received data set, the schema identifying which of the one or more fields contains sensitive data;
  for each record in the plurality of records, identify, based on the determined schema, instances of sensitive data in the received data set;
  extract the identified instances of sensitive data from one or more records of the plurality of records in the received data set;
  compile a queue of sensitive data values in an order the indentified instances of sensitive data are extracted;
  send, for processing as a batch, the queue of sensitive data values to a remote token generator, the remote token generator comprising an encryption system configured to encrypt individual values as tokens;
  receive a queue of tokens corresponding to the queue of sensitive data values from the remote token generator;
  generate a tokenized data set comprising a plurality of tokenized records arranged according to the format, wherein the tokenized records use a respective token of the received queue of tokens in place of each respective instance of the sensitive data, and wherein the tokenized data set conforms to the determined schema; and
  store the tokenized data set in a remote data storage.

16. The non-transitory computer readable medium of claim 15, wherein the instructions, when executed by the one or more processors, cause the one or more processors to:
  detect additional sensitive data in an unidentified field;
  generate an additional token corresponding to the additional sensitive data; and
  replace the additional sensitive data with the additional token in the tokenized data set.

17. The non-transitory computer readable medium of claim 15, wherein the remote data storage is cloud-based.

18. The method of claim 1, wherein the receiving the data set comprises receiving a batch of data set at a predetermined time interval.

19. The non-transitory computer readable medium of claim 15, wherein the instructions, when executed by the one or more processors, cause the one or more processors to determine the schema by querying a database containing records that identify the schema.

20. The non-transitory computer readable medium of claim 15, wherein the received data set is encrypted, and wherein the instructions, when executed by the one or more processors further cause the processors to:
  decrypt the received data set; and
  encrypt, after its generation, the tokenized data set.

* * * * *